(12) United States Patent
Song et al.

(10) Patent No.: US 12,341,434 B2
(45) Date of Patent: Jun. 24, 2025

(54) POWER SUPPLY WITH ACTIVE POWER BUFFER

(71) Applicant: Apple Inc., Cupertino, CA (US)

(72) Inventors: Yantao Song, Northville, MI (US); Chanwit Prasantanakorn, Santa Clara, CA (US); Bharat K Patel, San Martin, CA (US); Abby Cherian, Fremont, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 17/663,143

(22) Filed: May 12, 2022

(65) Prior Publication Data

US 2023/0275521 A1     Aug. 31, 2023

Related U.S. Application Data

(60) Provisional application No. 63/268,665, filed on Feb. 28, 2022.

(51) Int. Cl.
*H02M 1/42*     (2007.01)
*H02M 1/00*     (2006.01)
*H02M 3/335*    (2006.01)
*H02M 7/217*    (2006.01)

(52) U.S. Cl.
CPC ....... *H02M 3/33592* (2013.01); *H02M 1/007* (2021.05); *H02M 1/4208* (2013.01); *H02M 1/4258* (2013.01); *H02M 7/217* (2013.01); *H02M 1/4225* (2013.01); *H02M 3/33507* (2013.01); *H02M 3/33523* (2013.01); *H02M 3/33569* (2013.01)

(58) Field of Classification Search
CPC .... H02M 1/42; H02M 1/4208; H02M 1/4225; H02M 3/335; H02M 3/33507; H02M 3/33523; H02M 3/33569; H02M 3/33592
See application file for complete search history.

(56) References Cited

U.S. PATENT DOCUMENTS

| 5,654,880 A | * | 8/1997 | Brkovic | H02M 1/4258 363/17 |
|---|---|---|---|---|
| 5,734,562 A | | 3/1998 | Redi | |
| 6,430,692 B1 | | 8/2002 | Kimble et al. | |
| 8,624,433 B2 | | 1/2014 | Whitted et al. | |

(Continued)

OTHER PUBLICATIONS

International Search Report and Written Opinion for PCT Application No. PCT/US2023/013062 dated Jun. 1, 2023; 16 pgs.

(Continued)

*Primary Examiner* — Gary L Laxton
(74) *Attorney, Agent, or Firm* — FLETCHER YODER PC

(57) ABSTRACT

A power converter can include a rectifier that receives an AC input voltage and produces a rectified output voltage, a power factor correction (PFC) converter having an input coupled that receives the rectified output voltage of the rectifier and an output that provides an intermediate DC bus voltage, a DC-DC converter having an input that receives the intermediate DC bus voltage and produces a regulated DC output voltage, and control circuitry for the PFC converter stage that includes a relatively slower control loop that controls the PFC converter during steady state load conditions and at least one relatively faster control loop that controls the PFC converter during transient load conditions.

17 Claims, 10 Drawing Sheets

(56) References Cited

U.S. PATENT DOCUMENTS

| | | |
|---|---|---|
| 9,263,939 B2 | 2/2016 | Jin et al. |
| 9,742,341 B2 | 8/2017 | Watabu et al. |
| 9,917,520 B2 | 3/2018 | Wu |
| 10,498,148 B2 | 12/2019 | Mergener et al. |
| 10,680,533 B1 | 6/2020 | Courtney |
| 2005/0007083 A1* | 1/2005 | Yang .................. H02M 1/4225 323/282 |
| 2005/0068001 A1* | 3/2005 | Skaug ..................... H02M 1/10 318/807 |
| 2006/0152203 A1 | 7/2006 | Perry |
| 2007/0046105 A1 | 3/2007 | Johnson |
| 2007/0133233 A1* | 6/2007 | Cameron ............ H02M 1/4258 363/16 |
| 2009/0237057 A1 | 9/2009 | Dishman et al. |
| 2010/0134157 A1* | 6/2010 | Kawashima ............ H03L 7/099 327/156 |
| 2012/0256487 A1 | 10/2012 | Yamada |
| 2013/0201729 A1 | 8/2013 | Ahsanuzzaman et al. |
| 2014/0211519 A1* | 7/2014 | Hsu .................... H02M 1/4258 363/21.17 |
| 2014/0240051 A1 | 8/2014 | Buono |
| 2016/0141951 A1 | 5/2016 | Mao et al. |
| 2017/0126133 A1 | 5/2017 | Yang |
| 2018/0019662 A1 | 1/2018 | Sonnaillon |
| 2018/0183348 A1 | 6/2018 | Hu et al. |
| 2018/0269793 A1 | 9/2018 | Ahsanuzzaman et al. |
| 2018/0337610 A1 | 11/2018 | Eong et al. |
| 2019/0356231 A1 | 11/2019 | Radic |
| 2020/0266622 A1* | 8/2020 | Schwerman ........... H02H 5/005 |
| 2021/0143665 A1 | 5/2021 | Jimenez Pino et al. |
| 2022/0038019 A1 | 2/2022 | Gaona et al. |

OTHER PUBLICATIONS

U.S. Appl. No. 17/663,136, filed May 12, 2022, Chanwit Prasantanakorn.

U.S. Appl. No. 17/663,141, filed May 12, 2022, Yantao Song.

Grbovic, Petar J., et al., "A novel three-phase diode boost rectifier using hybrid half-DC-bus-voltage rated boost converter," IEEE Transcations on Industrial Electronics vol. 58, No. 4 (2010): 1316-1329v.

Tsang, Kai-Ming, and Wai-Lok Chan, "Multi-level multi-output single-phase active rectifier using cascaded H-bridge converter," IET Power Electronics vol. 7, Iss. 4 (2014): 784-794.

International Search Report and Written Opinion for PCT Application No. PCT/US2023/013062 dated Jul. 31, 2023; 29 pgs.

Tsai et al.; "Triple Loop Modulation (TL) for High Reliability and Efficiency in a Power Factor Correction (PFC) System", IEEE Transaction on Power Electronics, vol. 28, No. 7, Jul. 1, 2013, p. 3447-3458 (XP011484393.

U.S. Appl. No. 17/122,625, filed Dec. 15, 2020, Oh.

* cited by examiner

POWER SUPPLY WITH ACTIVE POWER BUFFER

CROSS-REFERENCE TO RELATED APPLICATION

This application claims priority to U.S. Provisional Application No. 63/268,665, filed Feb. 28, 2022, entitled "POWER SUPPLY WITH ACTIVE POWER BUFFER," which is hereby incorporated by reference in its entirety for all purposes.

BACKGROUND

Many electronic devices require AC-DC power supplies. Personal computers and their associated peripherals are examples of such electronic devices. In some cases, the size of the electronic device is sufficient that the AC-DC power supply having adequate capacity is sufficiently small that it may be contained within the electronic device's housing. In other cases, the AC-DC power supply must be located externally. The external power supply may be incorporated into the power plug for the electronic device, resulting in what is sometimes colloquially known as a "wall wart" power supply. The external power supply may also be a separate unit with a power cord that connects to a wall mains supply and a separate power cord that connects to the electronic device, resulting in what is sometimes colloquially known as a "power brick." Heretofore, in at least some applications, electronic device power requirements and size constraints have dictated external power supplies when internal power supplies would be preferable.

SUMMARY

Thus, for such applications, it would be desirable to have an AC-DC power supply design that allows for physically smaller power supplies that can meet the power demands of electronic devices that are increasingly smaller in size while having the same or larger power requirements than in the prior art.

A power converter can include a DC-DC converter stage having an input coupled to an input of the power converter and an output coupled to an output of the converter and an active power buffer coupled to the output of the power converter. The active power buffer can further include an energy storage capacitor and one or more switching devices selectively coupling the energy storage capacitor to the output of the power converter so as to alternately store energy in and discharge energy from the energy storage capacitor. Control circuitry of the power converter can include a first control loop that operates the DC-DC converter stage to regulate an average voltage across the energy storage capacitor of the active power buffer and a second control loop that operates the one or more switching devices of the active power buffer to regulate an output voltage of the power converter.

The power converter can be an AC-DC converter, and the DC-DC converter stage can be coupled to the input of the power converter by a rectifier. The DC-DC converter stage can be an isolated converter. The DC-DC converter stage can be a flyback converter. The flyback converter can employ a split magnetics arrangement having two or more flyback transformers with their secondary windings connected in parallel. The two or more flyback transformers can have their primary windings connected in series and driven by a single switching device. The two or more flyback transformers can have their primary windings connected in parallel and driven by respective switching devices for each primary winding. The first control loop can have a bandwidth less than twice the line frequency of an AC input to the converter. The first control loop can employ constant Ton control. The second control loop can have a bandwidth higher than the first control loop. The second control loop can employ duty cycle control.

An AC-DC converter can include a rectifier coupled to an AC input of the AC-DC converter, a flyback converter having an input coupled to the rectifier and an output coupled to an output of the AC-DC converter, and an active power buffer coupled to the output of the power converter. The active power buffer can include an energy storage capacitor and one or more switching devices selectively coupling the energy storage capacitor to the output of the power converter so as to alternately store energy in and discharge energy from the energy storage capacitor. The control circuitry can include a first control loop, having a bandwidth less than twice the line frequency of the AC input, that operates the flyback converter to regulate an average voltage across the energy storage capacitor of the active power buffer while providing unity power factor at the AC input of the AC-DC converter and a second faster control loop that operates the one or more switching devices of the active power buffer to regulate an output voltage of the power converter.

The flyback converter can employ a split magnetics arrangement having two or more flyback transformers with their secondary windings connected in parallel. The two or more flyback transformers can have their primary windings connected in series and driven by a single switching device. The two or more flyback transformers can have their primary windings connected in parallel and driven by respective switching devices for each primary winding. The active power buffer can further include an inductor coupling the one or more switching devices to output of the power converter, wherein the inductor and one or more switching devices can be operated as a bi-directional buck-boost converter.

A method of operating an AC-DC converter having a rectifier, a DC-DC converter, and an active power buffer coupled to an output of the DC-DC converter can include operating the DC-DC converter to maintain an average voltage across an energy storage capacitor of the active power buffer and operating one or more switching devices of the active power buffer to regulate an output voltage of the AC-DC converter. The average voltage can be selected to be approximately half-way between an output voltage of the AC-DC converter and a voltage rating of the energy storage capacitor. Operating the DC-DC converter to maintain an average voltage across an energy storage capacitor of the active power buffer can further include operating the DC-DC converter to present unity power factor at an input of the AC-DC converter. Operating the DC-DC converter to maintain an average voltage across an energy storage capacitor of the active power buffer can include generating PWM signals for one or more switching devices of the DC-DC converter using a constant on time control loop. Operating one or more switching devices of the active power buffer to regulate an output voltage of the AC-DC converter can include generating PWM signals for the one or more switching devices of the active power buffer using a duty cycle control loop.

A power converter can include a DC-DC converter having an output with an active power buffer coupled thereto. The active power buffer can include an energy storage capacitor and one or more switching devices selectively coupling the capacitor to the output to alternately store energy in and discharge energy from the capacitor. Control circuitry can include a DC-DC converter control loop that operates the DC-DC converter to regulate an average voltage across the capacitor and an active power buffer control loop that operates the one or more switching devices of the active power buffer to regulate an output voltage of the power converter. The DC-DC converter control loop can include a relatively slower control loop that controls the DC-DC converter during steady state load conditions and at least one relatively faster control loop that controls the DC-DC converter during transient load conditions.

The at least one relatively faster control loop can include a first relatively faster control loop that controls the DC-DC converter during transient load conditions resulting from a load increase and a second relatively faster control loop that controls the DC-DC converter during transient load condition resulting from a load decrease. The control circuitry can further include selection circuitry configured to select a reference signal from among the output signals of the relatively slower control loop, the first relatively faster control loop, and the second relatively faster control loop. The selected reference signal can be provided to a current controller and a pulse width modulation signal generator that generate drive signals for a switching device of the DC-DC converter.

The relatively slower control loop can be responsive to the voltage across the energy storage capacitor, and the at least one relatively faster control loop can be responsive to the voltage across the energy storage capacitor and a load current of the power converter. The at least one relatively faster control loop can compare the voltage across the energy storage capacitor to a reference voltage that is different than a reference voltage of the relatively slower control loop. The at least one relatively faster control loop can compare an instantaneous value of the load current to an average value of the load current over a time period. The faster control loop compares the instantaneous value of the load current to the average value of the load current over the time period plus an offset.

The power converter can be an AC-DC converter, and the DC-DC converter stage can be coupled to the input of the power converter by a rectifier. The DC-DC converter can be a flyback converter employing a split magnetics arrangement having two or more flyback transformers with their secondary windings connected in parallel.

The relatively slower control loop can have a bandwidth less than the line frequency of an AC input to the converter. The relatively slower control loop can have a bandwidth less than half the line frequency of the AC input to the converter.

An AC-DC converter can include a rectifier coupled to an AC input of the AC-DC converter, a flyback converter having an input coupled to the rectifier and an output coupled to an output of the AC-DC converter, and an active power buffer coupled to the output of the power converter. The active power buffer can further include an energy storage capacitor and one or more switching devices selectively coupling the energy storage capacitor to the output of the power converter to alternately store energy in and discharge energy from the energy storage capacitor and control circuitry including a flyback converter control loop that operates the flyback converter to regulate an average voltage across the energy storage capacitor of the active power buffer while providing unity power factor at the AC input of the AC-DC converter. The flyback converter control loop can include a relatively slower control loop that controls the flyback converter during steady state load conditions and at least one relatively faster control loop that controls the DC-DC converter during transient load conditions. The active power buffer control loop can operate the one or more switching devices of the active power buffer to regulate an output voltage of the power converter.

The at least one relatively faster control loop can include a first relatively faster control loop that controls the DC-DC converter during transient load conditions resulting from a load increase and a second relatively faster control loop that controls the DC-DC converter during transient load condition resulting from a load decrease. The control circuitry can further include selection circuitry configured to select a reference signal from among the output signals of the relatively slower control loop, the first relatively faster control loop, and the second relatively faster control loop. The selected reference signal can be provided to a current controller and a pulse width modulation signal generator that generate drive signals for a switching device of the DC-DC converter.

The relatively slower control loop can be responsive to the voltage across the energy storage capacitor, and the at least one relatively faster control loop can be responsive to the voltage across the energy storage capacitor and the load current. The at least one relatively faster control loop can compare the voltage across the energy storage capacitor to a reference voltage that is different than a reference voltage of the relatively slower control loop. The at least one relatively faster control loop can compare an instantaneous value of the load current to an average value of the load current over a time period. The faster control loop can compare the instantaneous value of the load current to the average value of the load current over the time period plus an offset.

The relatively slower control loop can have a bandwidth less than the line frequency of an AC input to the converter. The relatively slower control loop can have a bandwidth less than half the line frequency of the AC input to the converter.

The flyback converter can employ a split magnetics arrangement having two or more flyback transformers with their secondary windings connected in parallel and (a) the two or more flyback transformers can have their primary windings connected in series and driven by a single switching device; or (b) the two or more flyback transformers have their primary windings connected in parallel and driven by respective switching devices for each primary winding.

The active power buffer can further include an inductor coupling the one or more switching devices to output of the power converter, wherein the active power buffer control loop operates the inductor and one or more switching devices as a bi-directional buck-boost converter.

A method of operating an AC-DC converter having a rectifier, a DC-DC converter, and an active power buffer coupled to an output of the DC-DC converter can include operating one or more switching devices of the active power buffer to regulate an output voltage of the AC-DC converter and operating one or more switching devices of the DC-DC converter to maintain an average voltage across an energy storage capacitor of the active power buffer by controlling switching of the one or more switching devices of the DC-DC converter using a relatively slower control loop that controls the DC-DC converter during steady state load conditions and at least one relatively faster control loop that controls the DC-DC converter during transient load conditions. The average voltage can be selected to be approximately half-way between an output voltage of the AC-DC converter and a voltage rating of the energy storage capacitor. Operating the DC-DC converter to maintain an average voltage across an energy storage capacitor of the active power buffer further comprises operating the DC-DC converter to present unity power factor at an input of the AC-DC converter.

A power converter can include a rectifier that receives an AC input voltage and produces a rectified output voltage, a power factor correction (PFC) converter having an input coupled that receives the rectified output voltage of the rectifier and an output that provides an intermediate DC bus voltage, a DC-DC converter having an input that receives the intermediate DC bus voltage and produces a regulated DC output voltage, and control circuitry for the PFC converter stage that includes a relatively slower control loop that controls the PFC converter during steady state load conditions and at least one relatively faster control loop that controls the PFC converter during transient load conditions.

The at least one relatively faster control loop can include a first relatively faster control loop that controls the PFC converter during transient load conditions resulting from a load increase and a second relatively faster control loop that controls the PFC converter during transient load condition resulting from a load decrease. The control circuitry can further include selection circuitry configured to select a reference signal from among the output signals of the relatively slower control loop, the first relatively faster control loop, and the second relatively faster control loop. The selected reference signal can be provided to a current controller and a pulse width modulation signal generator that generate drive signals for a switching device of the PFC converter. The relatively slower control loop can be responsive to the intermediate DC bus voltage, and the at least one relatively faster control loop can be responsive to the intermediate DC bus voltage and a load current of the power converter. The at least one relatively faster control loop can compare the intermediate DC bus voltage to a reference voltage that is different than a reference voltage of the relatively slower control loop. The at least one relatively faster control loop can compare an instantaneous value of the load current to an average value of the load current over a time period. The faster control loop can compare the instantaneous value of the load current to the average value of the load current over the time period plus an offset.

The PFC converter can be a boost converter or a flyback converter. The relatively slower control loop can have a bandwidth less than half the line frequency of an AC input to the converter.

A method of operating an AC-DC converter having a rectifier, a power factor correction (PFC) converter, and a DC-DC converter can include operating one or more switching devices of the DC-DC converter to regulate an output voltage of the AC-DC converter and operating one or more switching devices of the PFC converter to maintain unity power factor at an input of the AC-DC converter and an average voltage across an intermediate bus of the AC-DC converter coupling an output of the PFC converter to an input of the DC-DC converter by controlling switching of the one or more switching devices of the PFC converter using a relatively slower control loop that controls the PFC converter during steady state load conditions and at least one relatively faster control loop that controls the PFC converter during transient load conditions.

The at least one relatively faster control loop can include a first relatively faster control loop that controls the PFC converter during transient load conditions resulting from a load increase and a second relatively faster control loop that controls the PFC converter during transient load condition resulting from a load decrease. Controlling switching of the one or more switching devices of the PFC converter using a relatively slower control loop that controls the PFC converter during steady state load conditions and at least one relatively faster control loop that controls the PFC converter during transient load conditions can further include selecting a reference signal from among the output signals of the relatively slower control loop, the first relatively faster control loop, and the second relatively faster control loop. The method can further include providing the selected reference signal to a current controller and a pulse width modulation signal generator that generate drive signals for one or more switching devices of the PFC converter.

The relatively slower control loop can be responsive to the intermediate DC bus voltage, and the at least one relatively faster control loop can be responsive to the intermediate DC bus voltage and a load current of the power converter. Controlling switching of the one or more switching devices of the PFC converter using a relatively slower control loop that controls the PFC converter during steady state load conditions and at least one relatively faster control loop that controls the PFC converter during transient load conditions can further include using the at least one relatively faster control loop to compare the intermediate DC bus voltage to a reference voltage that is different than a reference voltage of the relatively slower control loop. Controlling switching of the one or more switching devices of the PFC converter using a relatively slower control loop that controls the PFC converter during steady state load conditions and at least one relatively faster control loop that controls the PFC converter during transient load conditions can further include comparing an instantaneous value of a load current to an average value of the load current over a time period.

The relatively slower control loop can have a bandwidth less than the line frequency of an AC input to the converter. The relatively slower control loop can have a bandwidth less than half the line frequency of the AC input to the converter.

DETAILED DESCRIPTION

Figure 1:
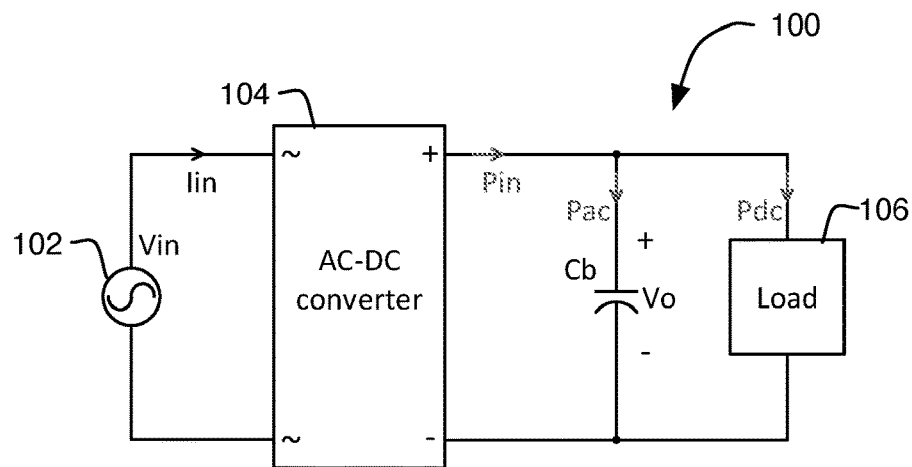
FIG. 1 illustrates a generalized AC-DC converter system and associated waveforms.
Figure 1:
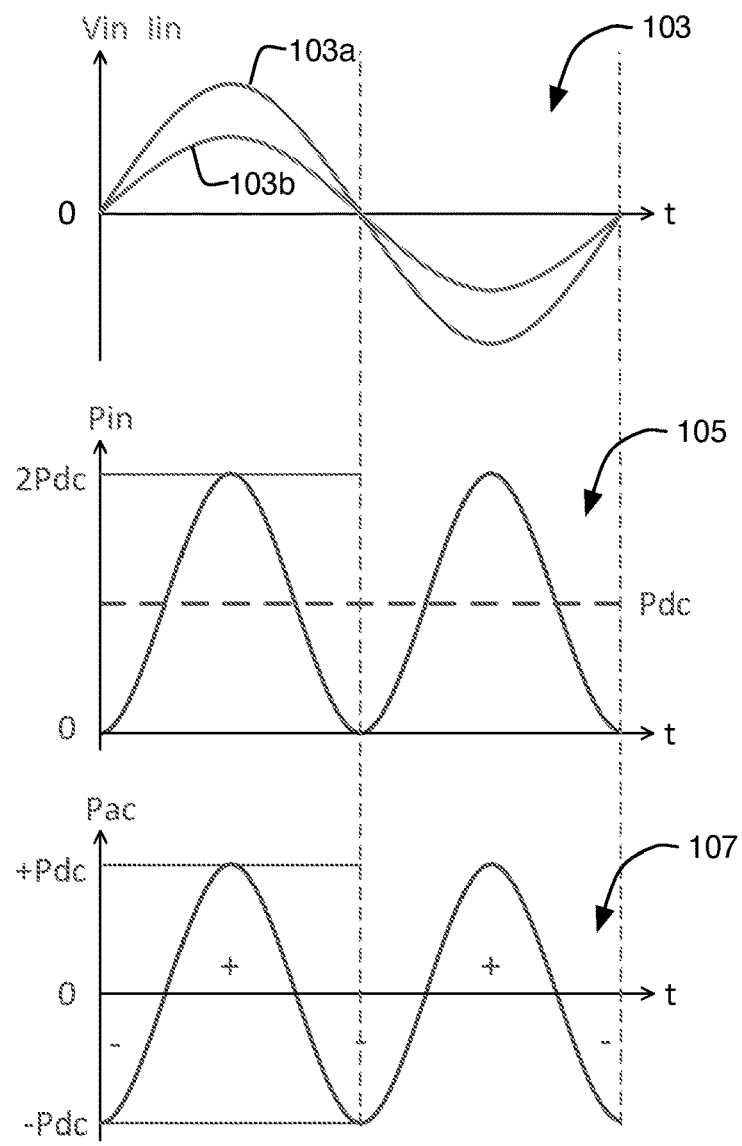

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a generalized AC-DC converter system 100 and associated waveforms 103/105/107. AC-DC converter system 100 can include an AC-DC converter 104 that receives an AC input voltage Vin and AC input current from an AC source 102. As but one example, AC-DC converter 104 could be a power supply for an electronic device such as a computer or associated peripheral. Also, as an example, AC source 102 could be an AC mains voltage connection, such as an outlet or receptacle in a home, office, or other installation. AC-DC converter 104 can provide power to a load 106. Load 106 may be any number of devices, for example the above-mentioned electronic device, such as a personal computer or associated peripheral. AC-DC converter 104 converts the AC input power into output power suitable for load 106, e.g., to a specific output voltage Vo.

The output power of AC-DC converter 104 is labeled as Pin. The input power to AC-DC converter will be Pin divided by the efficiency of the converter, although for purposes of this discussion, this efficiency is assumed to be 1 or 100% for simplicity. Power Pin may be thought of as being divided between the DC power requirement of load 106, labelled Pdc, and the instantaneous AC power either delivered to or sourced from buffer/output filter capacitor Cb. With reference to waveform 103, the input AC voltage Vin/103a and input AC current Iin/103b are in phase. In other words, the converter operates with unity power factor. Thus, Pin is the product of the input AC voltage 103a and the input AC current 103b. As discussed below, AC-DC converter 104 may be designed to operate at unity power factor or may operate with a non-unity power factor, in which case the power is the product of the input AC voltage, input AC current, and the cosine of the phase angle between them (also called the power factor). Waveform 105 plots the instantaneous value of power Pin, which is a sinusoid having twice the frequency of the supplied line frequency. This sinusoidal instantaneous power has a peak value of 2Pdc, a minimum value of zero, and an average value Pdc, corresponding to the power requirement of load 106. Subtracting the constant DC power requirement of load 106 from the instantaneous power produces the AC power waveform 107, which is sourced from or sunk to output filter capacitor Cb. In other words, during part of the 2x line frequency cycle, power is stored in capacitor Cb (denoted by the + in waveform 107), and during other parts of the 2x line frequency cycle, power is pulled from capacitor Cb (denoted by the − in waveform 107). Capacitor Cb thus acts as a (passive) power buffer that makes up the difference between the instantaneous AC input power and the DC output power.

Figure 2A:
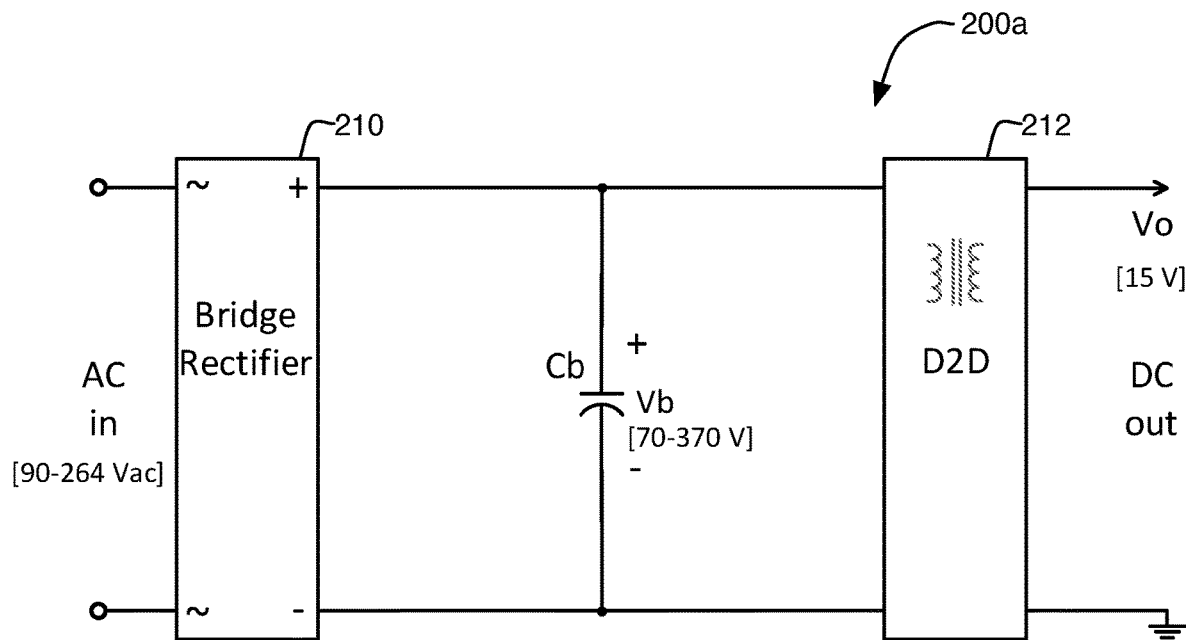
FIGS. 2A and 2B illustrate AC-DC converter systems without and with power factor correction.
Figure 2B:
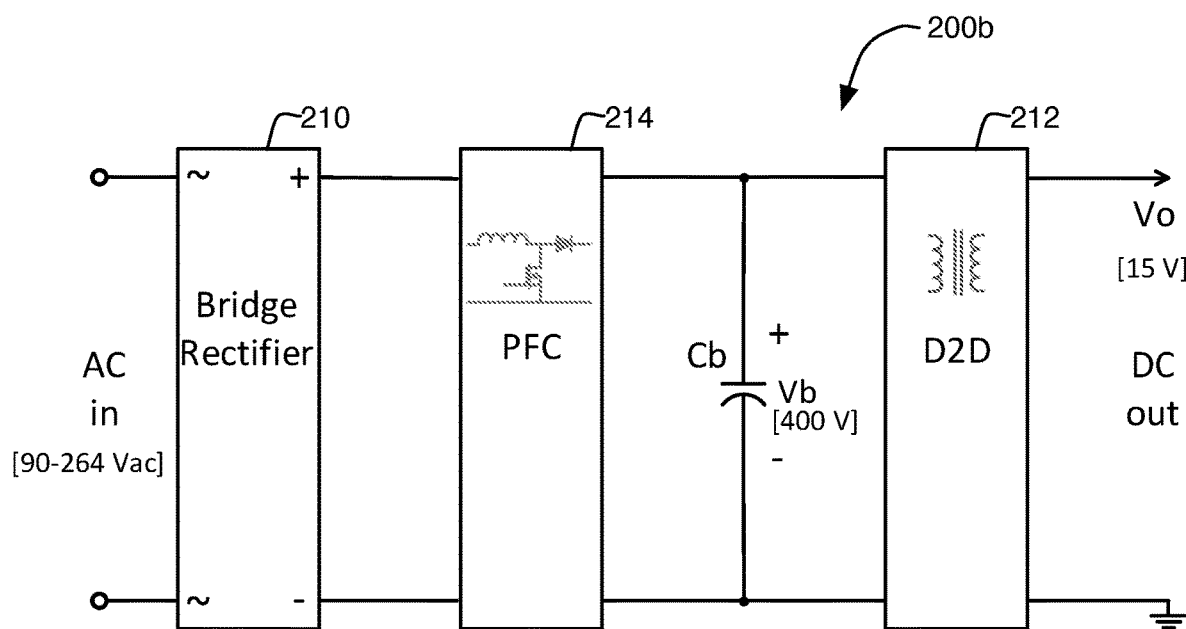

As noted above, an AC-DC converter may be designed with or without power factor correction. FIG. 2A illustrates a generalized single-stage AC-DC converter 200a without power factor correction. Such converters are sometimes used in applications in which the power requirement is less than about 75 W. FIG. 2B illustrates a generalized multi-stage AC-DC converter 200b with power factor correction. Such converters are sometimes used in applications in which the power requirement is more than about 75 W. (Various regulatory and other requirements sometimes require power factor correction in AC-DC power supplies/converters above a certain power rating.)

Turning first to FIG. 2A, the AC input voltage may be applied to a rectifier 210, which converts the AC input voltage Vin into a DC bus voltage Vb. The DC bus may be supported by a DC bus capacitor Cb (which may act as a power buffer in a way analogous to that described above). Rectifier 210 may be a diode bridge, either a full bridge or a half bridge. Alternatively, rectifier 210 could include active/controlled switching devices, such as transistors, thyristors, or other suitable devices. A DC-DC (D2D) converter 212 can receive the DC bus voltage Vb and produce an output DC voltage Vo suitable for the load to be powered. The DC-DC converter may be a switching converter incorporating any of a variety of topologies. For personal computer power supplies (as in the example application mentioned above) LLC resonant converters are often used. However, any suitable converter topology, including flyback converters, buck converters, etc. could also be used as appropriate for a given application.

As one example of the voltages that could be used, the AC input voltage may range between 90-260Vac, which includes the nominal range of AC line voltages supplied in various countries around the world. Rectification of this voltage may result in a DC bus voltage that ranges between 70-370V, depending on line and load conditions. DC-DC converter 212 can produce an output voltage of 15Vdc. These example voltages are provided here for illustration, but the AC-DC converter may be designed with any suitable operating voltages.

Turning now to FIG. 2B, the AC input voltage may be applied to a rectifier 210, which converts the AC input voltage Vin into a DC voltage that can be supplied to a power factor correction (PFC) stage 214. As above, rectifier 210 may be a diode bridge, either a full bridge or a half bridge. Alternatively, rectifier 210 could include active/controlled switching devices, such as transistors, thyristors, or other suitable devices. PFC stage 214 may be a switching converter such as a boost converter that draws current from the rectified AC input in phase with the voltage. The output of PFC stage 214 can be a DC bus voltage Vb. The DC bus may be supported by a DC bus capacitor Cb (which may act as a power buffer in a way analogous to that described above). A DC-DC (D2D) converter 212 can receive the DC bus voltage Vb and produce an output DC voltage Vo suitable for the load to be powered. The DC-DC converter may be a switching converter incorporating any of a variety of topologies. For personal computer power supplies (as in the example application mentioned above) LLC resonant converters are often used. However, any suitable converter topology, including flyback converters, buck converters, etc. could also be used as appropriate for a given application.

As one example of the voltages that could be used, the AC input voltage may again range between 90-260Vac, which includes the nominal range of AC line voltages supplied in various countries around the world. Rectification of this voltage and operation of PFC stage 214 may result in a DC bus voltage of around 400V, due to the boost/PFC operation of PFC stage 214. (The DC bus voltage may be more accurately controlled/regulated in the multi-stage converter case.) DC-DC converter 212 can, as in the preceding example, produce an output voltage of 15Vdc. These example voltages are provided here for illustration, but the AC-DC converter may be designed with any suitable operating voltages.

In the foregoing examples, capacitor Cb acts as a power buffer to make up the difference between the instantaneous AC power and the DC power. For a constant DC load, energy will be stored in the (passive) power buffer during a portion of the AC line cycle (when the input AC voltage and current are relatively high) and drawn from the (passive) power buffer during a portion of the AC line cycle (when the input AC voltage and current are relatively low). Depending on the operating voltage and current, as well as the power requirements, the capacitance required may be relatively large. Again using a personal computer power supply as an example, with typical operating voltage and power requirements, the capacitance may range from several tens to hundreds of microfarads (or more). Capacitors used in such applications (e.g., electrolytic capacitors) with the required capacitance and voltage ratings may take up a relatively large volume that makes it difficult to incorporate them within the housing of some small or slim devices.

Figure 3:
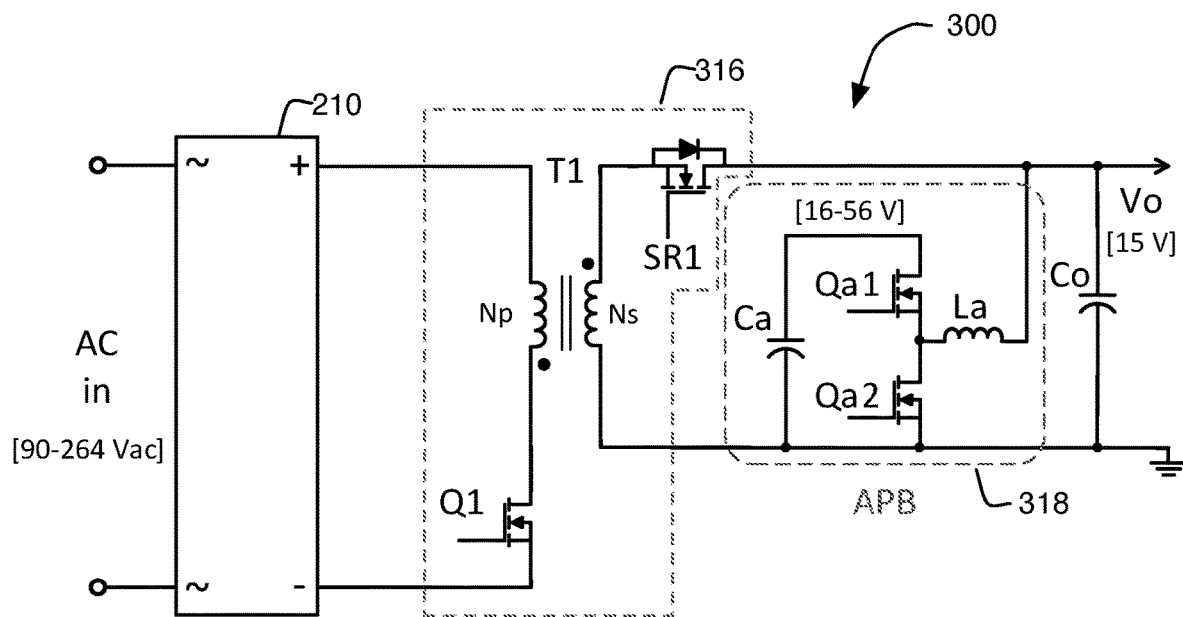
FIG. 3 illustrates a schematic of an AC-DC converter with an active power buffer.

FIG. 3 illustrates a schematic of an AC-DC converter 300 with an active power buffer 318. This arrangement can reduce the physical volume required as compared to a converter with power buffering capacitors as described above. Like the AC-DC converters described above, converter 300 includes a rectifier 210 that rectifies an AC input (e.g., having a range of 90-264Vac) to a DC voltage. This DC (rectified AC) voltage can then be supplied to the input of a flyback converter 316. The output of flyback converter 316 can produce an output voltage Vo (again 15V as in the examples discussed above, although other values are also possible). A flyback converter can be advantageously used in AC-DC converter applications because it inherently provides galvanic isolation between the input and output. Other converter topologies could be used in accordance with the teachings herein (such as an LLC or buck converter as discussed above), although such arrangements might require other arrangements for galvanic isolation (e.g., an isolation transformer). Converter 300 may also include an output filter capacitor Co.

The most basic flyback converter includes a main switch Q1, a flyback transformer T1 having primary winding Np and secondary winding Ns, and an output rectifier SR1. Output rectifier SR1 is illustrated as synchronous rectifier switch, although passive rectifier devices could also be used. Flyback transformer T1 may also be thought of as mutually coupled flyback inductors Np and Ns. Additionally, these windings/inductors may have a turns ratio Np/Ns, which can scale the output voltage/current as desired. More complicated flyback converter designs, including various clamp circuits, resonant energy recovery circuits, etc. may also be used to provide for more efficient or otherwise optimized operation.

Basic flyback converter operation may be understood as follows: When main switch Q1 is turned on, a DC voltage is applied across primary winding Np, storing energy in the inductance of the flyback transformer. Because a DC voltage is applied to the primary winding, no current flows in the secondary winding Ns of flyback transformer T1. When main switch Q1 is turned off, the energy stored in the inductance of flyback transformer causes the voltage across the primary winding to reverse, inducing current flow out of the secondary winding Ns of flyback transformer T1. This discharges energy stored in the flyback transformer to the load through synchronous rectifier switch SR1. The cycle repeats when main switch Q1 is again closed, with the timing of this operation being controlled to provide regulation of the output voltage Vo.

Converter 300 does not include a passive power buffer capacitor Cb, such as those described above with reference to FIGS. 1, 2A, and 2B. Rather, converter 300 incorporates an active power buffer (APB) 318. Active power buffer 318 can include an energy storage capacitor Ca, switching devices Qa1 and Qa2, and inductor La. To achieve power buffering functionality, the combination of switches Qa1 and Qa2 with inductor La may be operated as a bi-directional buck-boost converter. More specifically, when the instantaneous power delivery of flyback converter 316 is greater than the power requirement of a connected load (not shown in FIG. 3), switches Qa1, Qa2, and inductor La may operate as a boost converter to store excess energy in capacitor Ca (by charging capacitor Ca to a voltage higher than output voltage Vo). Conversely, when the instantaneous power delivery of flyback converter 316 is less than the power requirement of a connected load, switches Qa1, Qa2, and inductor La may operate as a buck converter to discharge energy stored in capacitor Ca to the output bus for delivery to a connected load. Further details of the operation of active power buffer 318 are described in greater detail below.

The amount of energy stored in capacitor Ca is proportional to the capacitance of capacitor Ca and the square of the voltage across the capacitor. The physical size of a capacitor of a given type is determined primarily by the energy storage capacity, i.e., the rated voltage and the capacitance. Thus, a capacitor Ca may be selected to have a physical size, capacitance, and voltage rating that allows for sufficient energy storage to achieve the power buffering functionality described herein. The operating voltage of capacitor Ca can swing between a voltage that is slightly greater than the output DC bus voltage up to the voltage rating of the chosen capacitor or a substantial fraction thereof, which maximizes the capacitor's energy storage capability. Continuing with the exemplary typical voltages for AC-DC converters used in a power supply for a personal computer, the voltage across capacitor Ca might vary between 16-56V for the exemplary 15V output. However, as with all the examples discussed herein, the operating voltages take on any values selected as suitable for a given application.

Figure 4:
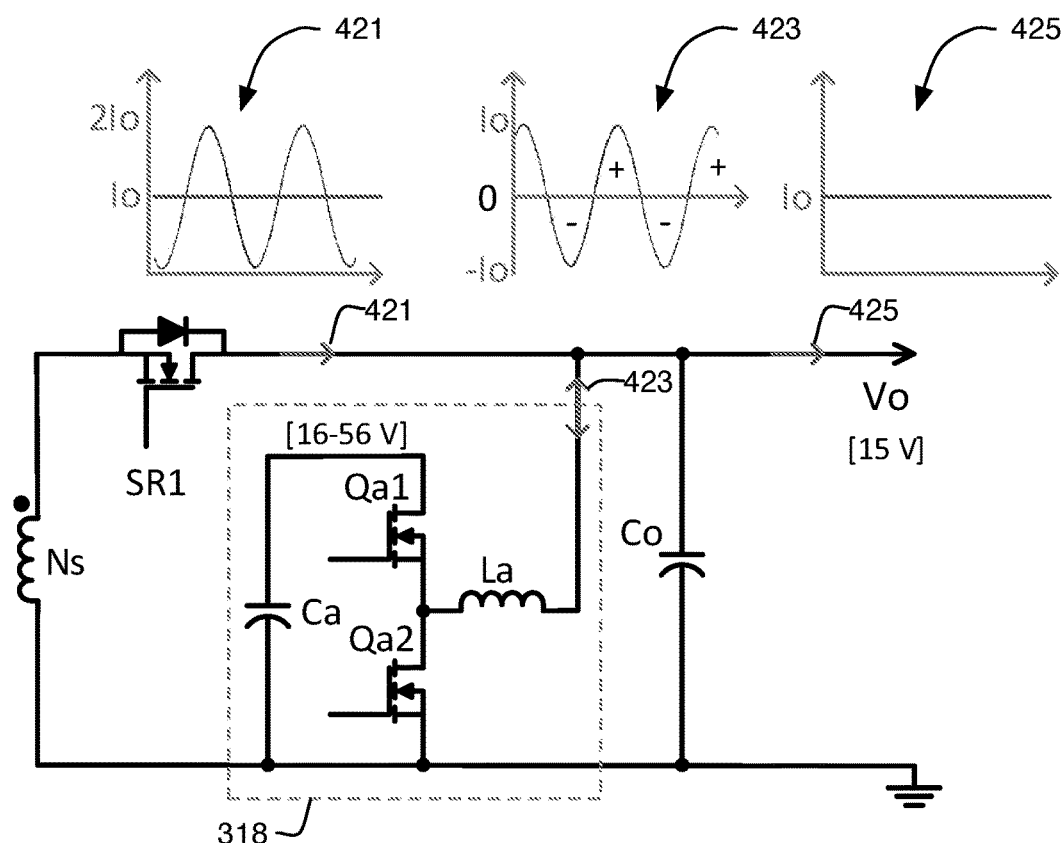
FIG. 4 illustrates an active power buffer and associated current waveforms.

FIG. 4 illustrates active power buffer 318 in greater detail with associated current waveforms. More specifically, current 421 is the output current of flyback converter 316. Current 423 is the input/output current of active power buffer 318. Positive current 423 corresponds to energy being stored in capacitor Ca by boost converter operation of switches Qa1 and Qa2 in conjunction with inductor La. Negative current 423 corresponds to energy being discharged from capacitor Ca by buck converter operation of switches Qa1 and Qa2 in conjunction with inductor La. Current 425 is the load current supplied to a connected load (not shown in FIG. 4). These three currents sum to zero. As can be seen in plot 421, the output current of flyback converter 316 is a sinusoidal current ranging between zero and twice the load current Io at twice the line frequency. As can be seen in plot 423, the active power buffer current is a sinusoidal current ranging between negative Io and positive Io. Finally, as can be seen in plot 425, the load current is a DC current with magnitude Io. The magnitude Io of the output current is the power requirement of a connected load (not shown in FIG. 4) divided by the output voltage Vo. It should be noted that these current waveforms 421, 423, and 425 generally correspond to the power waveforms 105 and 107 discussed above with reference to FIG. 1.

Figure 5A:
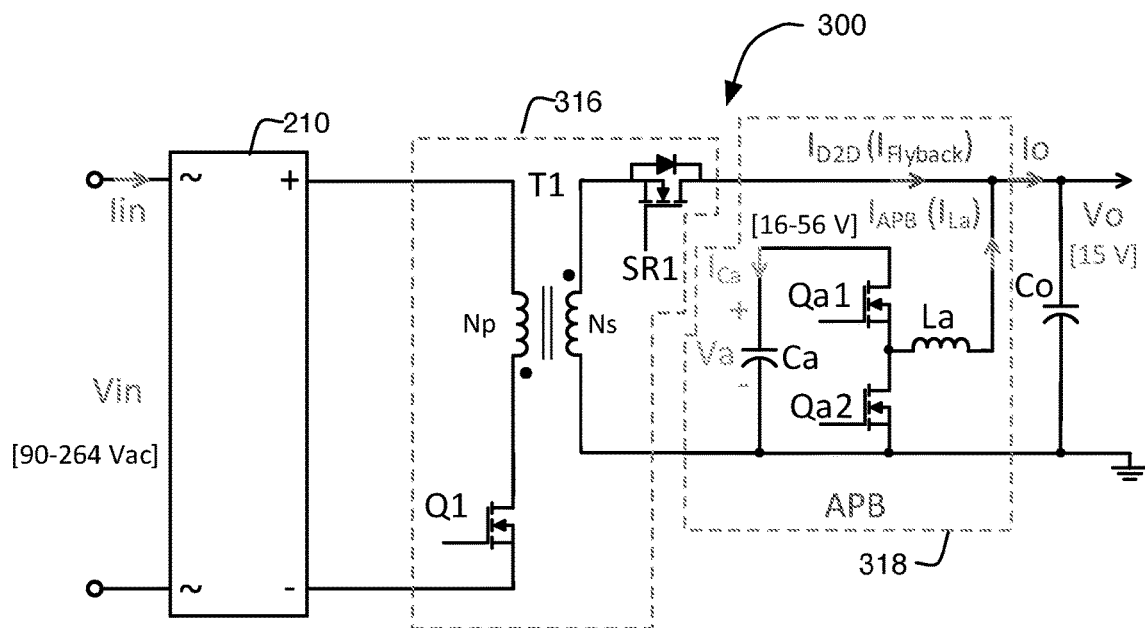
FIGS. 5A and 5B illustrate an AC-DC converter with an active power buffer and associated waveforms.
Figure 5B:
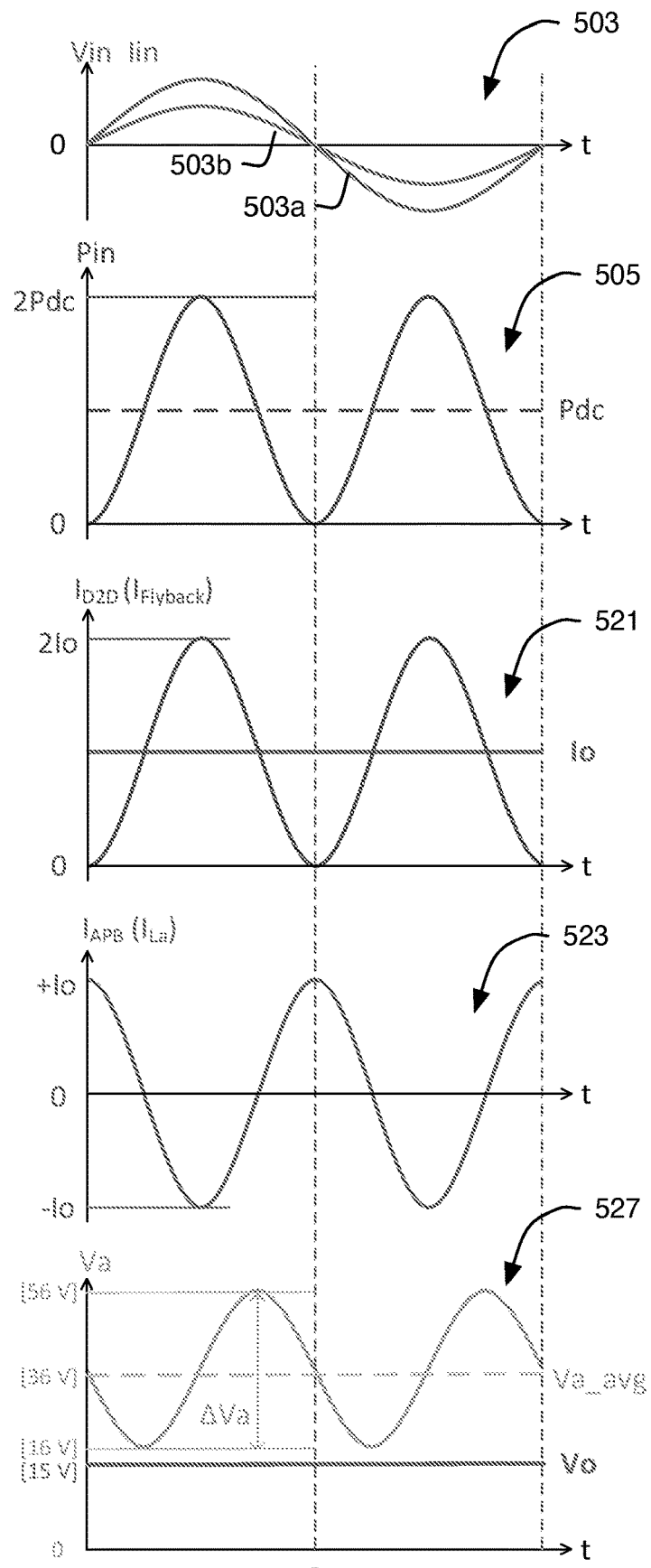

FIGS. 5A and 5B illustrate an AC-DC converter 300 with an active power buffer 318 and associated waveforms 503, 505, 521, 523, and 527. Converter 300 is generally as discussed above with reference to FIG. 3, with various additional currents and voltages identified in the schematic of FIG. 5A. Plots of these current and voltage waveforms are plotted in FIG. 5B. More specifically AC input voltage Vin and AC input current Iin are identified and plotted in FIG. 5B as waveforms 503a and 503b. The product of the AC input voltage Vin and the AC input current Iin is the instantaneous input power Pin, which is plotted in waveform 505, which corresponds to waveform 105 discussed above with respect to FIG. 1. Flyback converter 316 has an output current ID2D/IFlyback (discussed above with reference to FIG. 4 as current 421), which is plotted in FIG. 5B as waveform 521. Active power buffer has an input/output current IAPB/ILa (discussed above with reference to FIG. 4 as current 423), which is plotted in FIG. 5B as waveform 523. Finally, storage capacitor Ca has an associated voltage Va and current Ica. Voltage Va is plotted in FIG. 5B as waveform 527. Current Ica is not plotted in FIG. 5B.

Turning now to FIG. 5B, with reference to plot 503, the input AC voltage Vin/503a and input AC current Iin/503b are in phase. In other words, the converter operates with unity power factor. Thus, the input power Pin is the product of the input AC voltage 103a and the input AC current 103b Waveform 503 plots the instantaneous value of power Pin, which is a sinusoid having twice the frequency of the supplied line frequency. This sinusoidal instantaneous power has a peak value of 2Pdc, a minimum value of zero, and an average value Pdc, corresponding to the power requirement of a connected load (not shown in FIG. 5A). As can be seen in plot 521, the output current of flyback converter 316 (ID2D/IFlyback) is a sinusoidal current ranging between zero and twice the load current Io at twice the line frequency. As can be seen in plot 523, the active power buffer current IAPB (ILa) is a sinusoidal current ranging between negative Io and positive Io. Finally, as can be seen in plot 527, the voltage Va across capacitor Ca sinusoidally varies between a value slightly greater than the output voltage Vo (e.g., 16V vs. 15V, as discussed above), with an average value Va_avg. This average value Va_avg is used by the controller for the converter as described in greater detail below with reference to FIG. 6.

Figure 6:
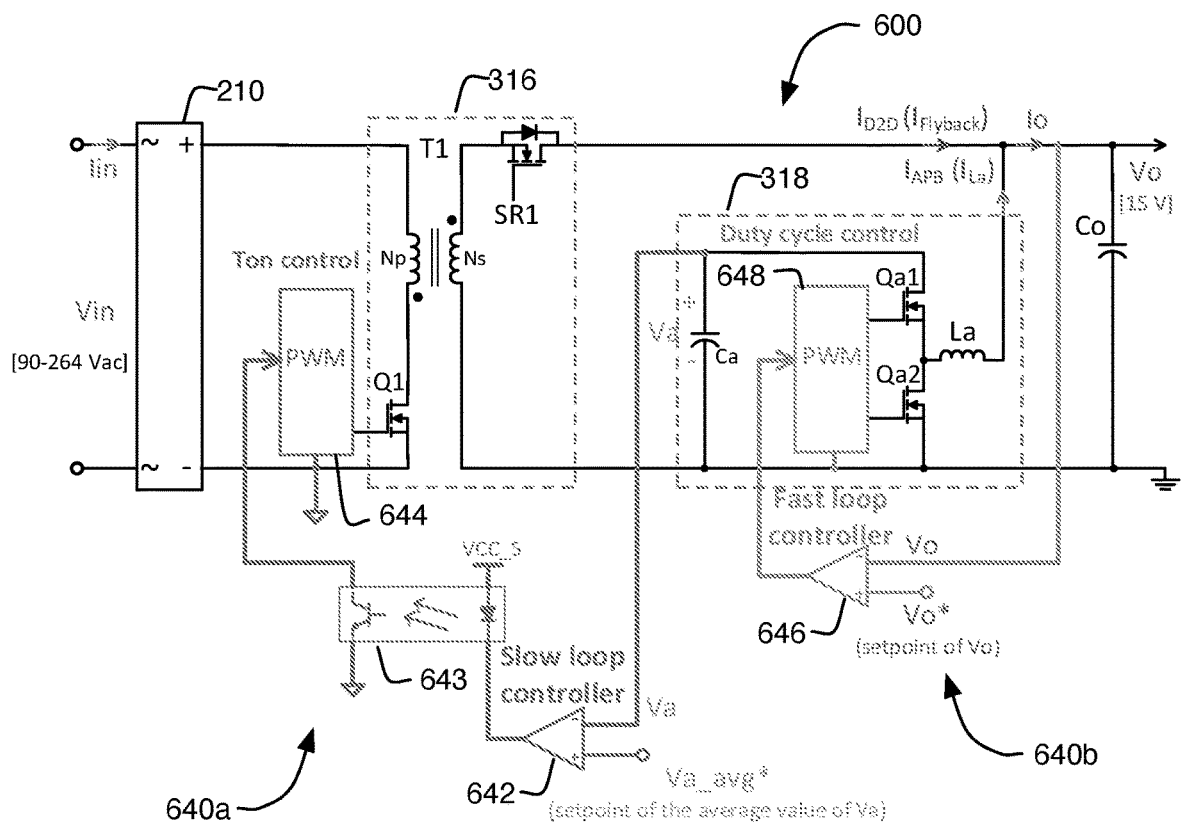
FIG. 6 illustrates an AC-DC converter with an active power buffer and an exemplary control system.

FIG. 6 illustrates an AC-DC converter 600 with an active power buffer 318 and an exemplary control system. The control system includes flyback controller 640a and active power buffer 640b. Flyback controller 640a can be operated to control the average voltage Va_avg across capacitor Ca. This is distinct from conventional flyback converter controllers, which are controlled to regulate the output voltage of the flyback converter (Vo, in this case). Setpoint Va_avg may be selected based on the voltage swing and capacitance values as discussed above. For example, Va_avg may be halfway between the output voltage Vo (or slightly above for safety margin) and the peak voltage rating of capacitor Ca (or slightly below for safety margin). The exact voltage value is not critical, but greater deviations from the output bus voltage and capacitor voltage rating will decrease the effective use of the energy storage capability of capacitor Ca. Because of this relatively large voltage swing range, a lower capacitance value is required to store the energy required to compensate for the output ripple of the flyback converter.

In any case, flyback controller 640a may include a "slow" loop controller, such as a proportional, proportional-integral, or proportional-integral-derivative controller 642 that operates with a controller bandwidth that is less than twice the line frequency. This allows control of voltage Va to match the input-output power balance and provide unity power factor operation without being influenced by the twice line frequency ripple associated with the rectified AC input. Controller 642 is illustrated as error amplifier 642, which compares the difference between the instantaneous capacitor voltage Va with the Va_avg setpoint. Although illustrated in this fashion, the controller could be implemented using analog, digital, or hybrid analog/digital circuitry as well including using programmable controllers such as microcontrollers, microprocessors, field programmable gate arrays (FPGAs), etc., any or all of which may be integrated into an application specific integrated circuit (ASIC). In the illustrated example, the controller/error amplifier is located on the secondary side of flyback converter and is coupled to the primary side by an optocoupler 643. In some embodiments, the feedback signal Va could be provided to the optocoupler, with the controller/error amplifier residing on the primary side. In either case, the output signal of the slow loop regulating the capacitor voltage may be input into a pulse width modulation (PWM) controller 644 that generates drive signals for main switch Q1. Depending on the implementation, PWM controller could also generate corresponding drive signals for other components, such as auxiliary switches associated with a clamp or energy recovery circuit (not shown). In some embodiments, the PWM controller may employ constant on time control, in which the on time of main switch Q1 is modulated to provide the desired voltage Va across capacitor Ca. In some embodiments, the PWM controller may be integrated with the controller and may similarly employ any appropriate combination of analog, digital, and/or programmable circuitry.

Also illustrated in FIG. 6 is active power buffer controller 640b. Active power buffer controller 640b is a "fast" loop, which can operate much faster than the slow loop and the line frequency to regulate the output voltage Vo. For example, the fast loop may have a controller bandwidth on the order of kilohertz (kHz), tens of kHz, or even hundreds of kHz. This controller may include a proportional, proportional-integral, or proportional-integral-derivative controller represented by error amplifier 646, which compares the output voltage Vo to output voltage setpoint Vo*. Like the slow loop controller discussed above, this representation is illustrative, and the controller may be implemented with any appropriate combination of analog, digital, and/or programmable circuitry including various integrated controllers. The resulting error signal can be provided to a PWM controller 648. PWM controller 648 can implement duty cycle control of switches Qa1 and Qa2 to provide the desired bidirectional buck-boost operation. In some cases, the PWM controller may be integrated with the remainder of the fast control loop circuitry.

In other words, the controller may be similar to what would be used to implement a synchronous buck converter that generates a regulated voltage Vo from input voltage Va by operating a half bridge with upper switch Qa1 and lower switch Qa2 in conjunction with inductor La. Such control will operate upper switch Qa1 with a duty cycle that produces the desired bucking operation, with lower switch Qa2 having a substantially complementary duty cycle that acts as a synchronous rectifier. In this context, "substantially complementary" means that when Qa1 is on, Qa2 is off, and vice-versa, except for an intervening "dead time." This intervening dead time may be a relatively short time (relative to the respective on times) and can be used to prevent short-circuiting the half bridge. Optionally, this dead time could also be used (with appropriate additional circuitry) to allow for zero voltage switching of the respective switching devices.

When the instantaneous power production of flyback converter 316 is less than the power requirements of a connected load (not shown in FIG. 6), the control operation described above will cause active power buffer 318 to act as a buck converter supplying the power deficit to the connected load. When the instantaneous power production of flyback converter 316 is greater than the power requirements of a connected load (not shown in FIG. 6), the control operation described above will cause active power buffer 318 to act as a boost converter supplying the power surplus to capacitor Ca. In other words, controller 640b operates switches Qa1 and Qa2 to maintain voltage regulation of Vo from Va, and current will flow in the required direction to achieve this regulation.

The above-described implementations of the respective controllers 640a and 640b are simplified for purposes of understanding. It is to be appreciated that either or both control loops may include additional features, including without limitation, current limiting, overcurrent protection, zero voltage and/or zero current switching, and the like. Additionally, while described in terms of "analog" control loops based on error amplifiers, such circuitry could be implemented using any suitable analog, digital, and/or hybrid circuitry, based on discrete components, integrated circuits, ASICs, programmable processors such as microcontrollers, FPGAs, etc. Any and all such implementations may be configured to provide the functionality described above.

Figure 7A:
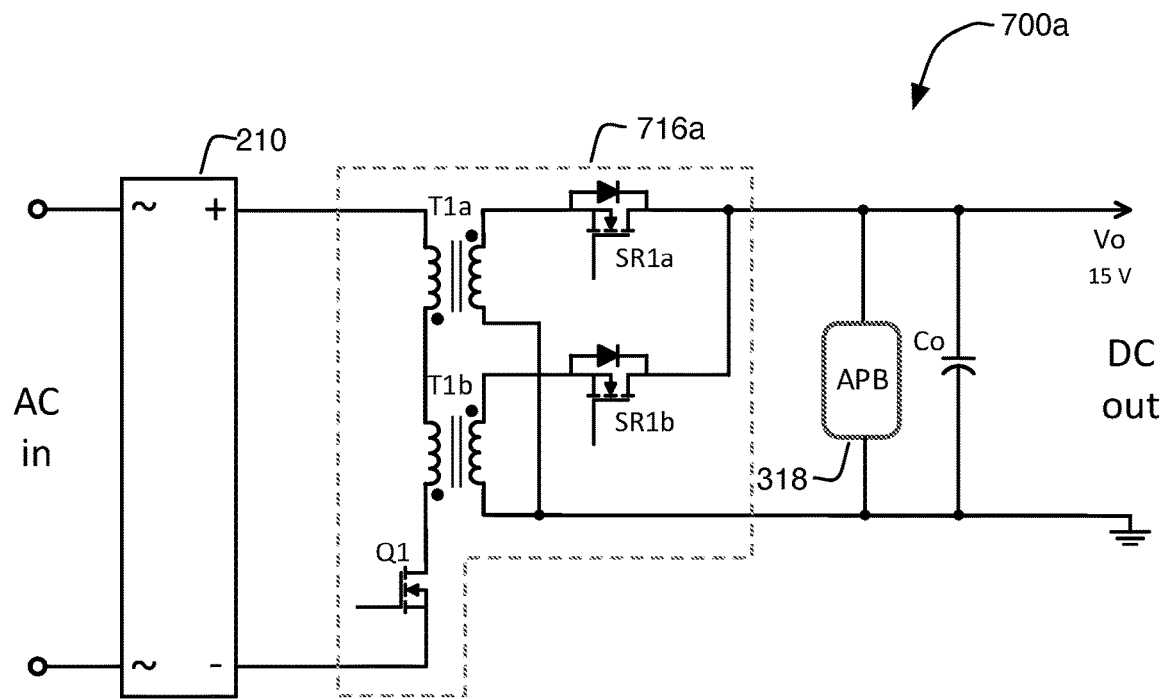
FIGS. 7A and 7B illustrate AC-DC converters with active power buffers and split magnetics.
Figure 7B:
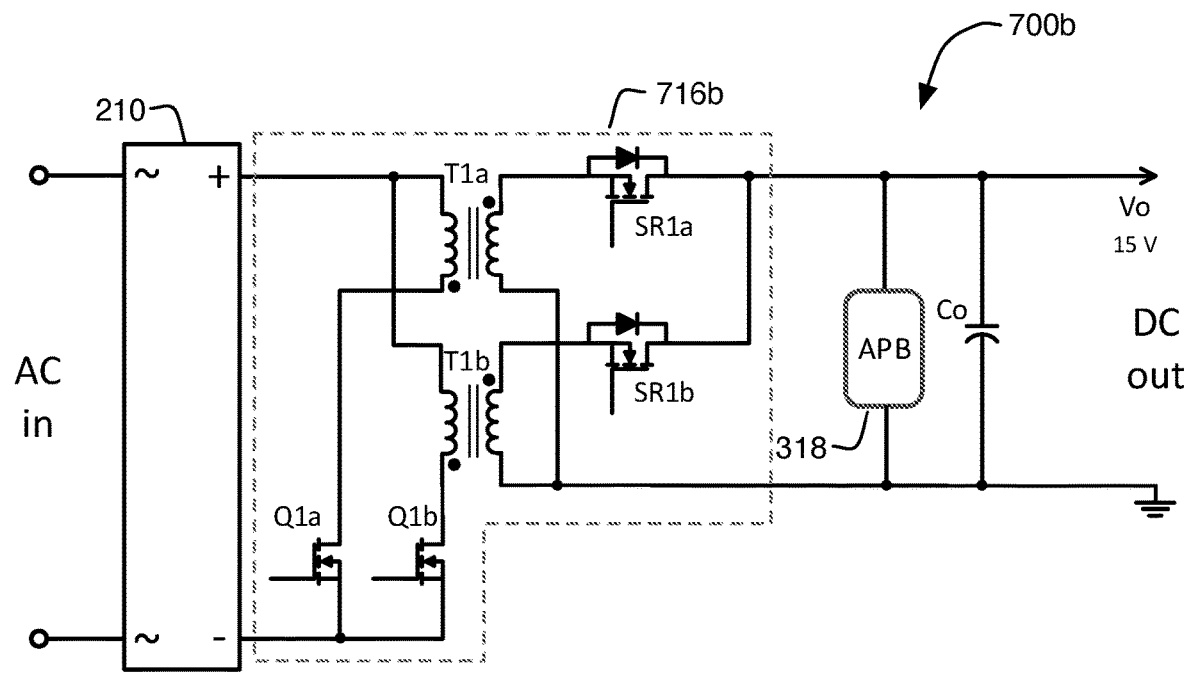

Depending on the voltage and power requirements of an AC-DC power supply as described above, it may be that the flyback transformer becomes the largest/tallest component of the system. For some spatially constrained applications it may be desirable to split this magnetic component into two flyback transformers (which can alternatively be thought of as two pairs of mutually coupled inductors). FIGS. 7A and 7B illustrate AC-DC converters with active power buffers and split magnetics. In FIG. 7A, a converter 700a includes a rectifier 210 that receives an AC input voltage and provides a DC (rectified AC) input voltage to a flyback converter 716a that includes a split magnetics arrangement. More specifically, there are two flyback transformers T1a and T1b, which have their primary windings connected in series and their output windings coupled in parallel. A single main switch Q1 is provided to drive the primary windings as discussed above. Dual output rectifiers SR1a and SR1b are provided for reach respective secondary winding. The combined output is then coupled to the converter output, and an active power buffer 318 is provided, which operates as described above. In this configuration, the operation of the respective transformers is synchronized, meaning that both are in the charge or discharge stage at the same time.

FIG. 7B illustrates an alternative converter 700b with a different input configuration. More specifically, the rectified AC input voltage from rectifier 210 is provided to a parallel combination of the primary windings of flyback transformers T1a and T1b. Each primary winding is controlled by a corresponding main switch Q1a or Q1b. Thus, more specifically, the parallel combination is a parallel combination of the respective primary windings of the flyback transformers T1a and T1b and their corresponding main switches Q1a and Q1b. This configuration allows operation of the respective flyback transformers to be interleaved, meaning that flyback transformer T1a can be charging while T1b is discharging and vice versa. Such an arrangement can use a single controller as described above with respect to FIG. 6, with complementary output PWM signals being supplied to the respective switches Q1a and Q1b. The secondary side of converter 700b is as described above with respect to FIG. 7A.

In some performance regimes, the converters above may exhibit undesirable transient behavior. For example, considering the converter depicted in FIG. 6, slow control loop 640a has a relatively low bandwidth. Because of this low bandwidth, the slow control loop, and thus the converter, may have a very limited dynamic response. For example, if load current suddenly increases, the input power (from the AC side) may be much lower than the output power (Volo). As a result, the energy stored in capacitor Ca will discharge to power the output, but for a large enough transient this can completely discharge capacitor Ca possibly causing the entire power supply to crash. A sudden load decrease can have the opposite effect. When the load current dramatically decreases, the input power may be much higher than the output power. As a result, the excess energy must be stored in capacitor Ca, which can cause high voltages that may exceed the rating of capacitor Ca and/or switching devices Qa1 and Qa2. A brute force solution to this problem is to increase the size of capacitor Ca; however, this can negate the volume and packaging benefits of eliminating the DC bulk capacitor that the active power buffer set out to achieve.

Figure 8:
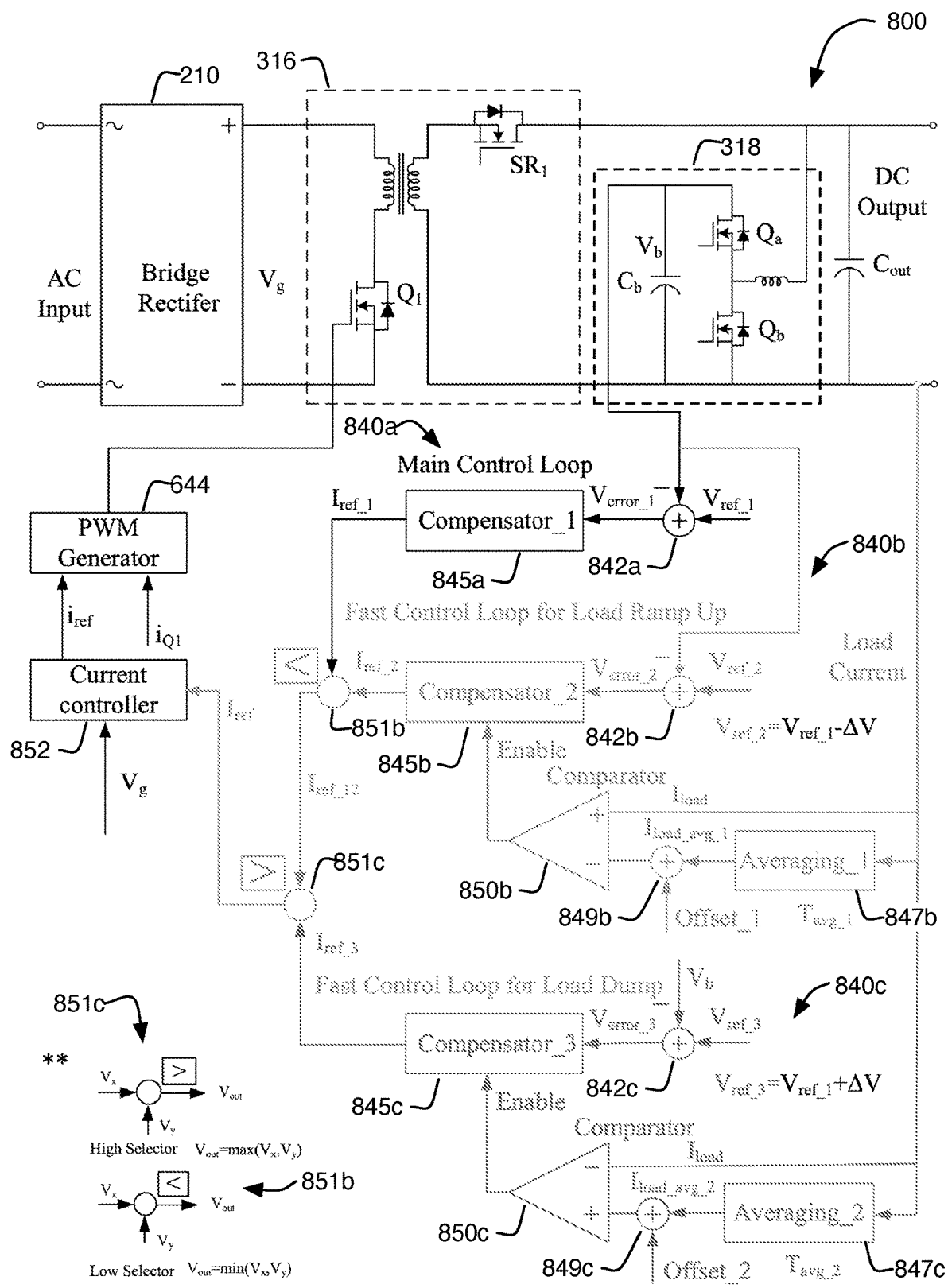
FIG. 8 illustrates an AC-DC converter with multiple control loops.

FIG. 8 illustrates an additional or alternative control arrangement that can address these transient issues without unduly increasing the size of the capacitor in the active power buffer. Converter 800 can employ bridge rectifier 210, flyback converter 316, and active power buffer 318 as was described above, for example with reference to FIG. 6. Additionally, can include three control loops 840a, 840b, and 840c that control switching of the main switch Q1 of flyback converter 316 to regulate the voltage Vb appearing across energy storage capacitor Cb of active power buffer 318. Main control loop 840a can operate as generally described above, being a relatively slow control loop that effectively regulates the average voltage across capacitor Cb. To do so, main control loop subtracts the voltage Vb from a reference voltage Vref1 in error amplifier 842a to produce an error signal Verror1. This error signal may be input into a compensator 845a that may be a proportional, integral, and/or derivative controller that implements a suitable transfer function to achieve desired control responsiveness and stability. Compensator 845a (along with all control circuitry of control loop 840b) may be implemented using any combination of analog, digital, and/or programmable circuitry, as was described above. The output of compensator 845a can be a first current reference signal Iref1 that goes through a selection process described in greater detail below with reference to selectors 851b and 851c. Ultimately, the selected current reference signal can be provided to current controller 852, which can provide suitable control signals to PWM generator 644 to regulate the switching of main switch Q1 of flyback converter 316.

Control loop 840b can be a faster control loop that can be active only in response to increasing load transients. Thus, the load current can be input into an averaging circuit 847b that generates an average load current signal Iload_avg1. This may be summed with an offset value Offset_1 using summing circuitry 849b and input into the negative/inverting input of a comparator 850b. The instantaneous load current signal may be input into the positive/non-inverting input of comparator 850b. As a result, comparator 850b can output an Enable signal that activates compensator 845b only in response to an instantaneous load current that exceeds the average load current by a predetermined offset amount. This current condition would correspond to a significant load increase at the output of converter 800.

Fast control loop for load ramp up control loop 840b can therefore operate as generally described above, being a relatively faster control loop that effectively regulates the voltage across capacitor Cb in response to an increasing load. To do so, fast load ramp up control loop 840b subtracts the voltage Vb from a reference voltage Vref2 equal to Vref1-$\Delta$V in error amplifier 842b to produce an error signal Verror2. (The reference voltage may be offset by $\Delta$V to reflect voltage dip associated with an increasing load transient.) Error signal Verror2 may be input into a compensator 845b that may be a proportional, integral, and/or derivative controller that implements a suitable transfer function to achieve desired control responsiveness and stability. Compensator 845b (along with all control circuitry of control loop 840b) may be implemented using any combination of analog, digital, and/or programmable circuitry, as was described above. The output of compensator 845b can be a second current reference signal Iref2 that goes through a selection process described in greater detail below with reference to selectors 851b and 851c. Ultimately, the selected current reference signal can be provided to current controller 852, which can provide suitable control signals to PWM generator 644 to regulate the switching of main switch Q1 of flyback converter 316.

Control loop 840c can be a faster control loop that can be active only in response to decreasing load transients. Thus, the load current can be input into an averaging circuit 847c that generates an average load current signal Iload_avg2. This may be summed with an offset value Offset_2 using summing circuitry 849c and input into the positive/non-inverting input of a comparator 850c. The instantaneous load current signal may be input into the negative/inverting input of comparator 850c. As a result, comparator 850c can output an Enable signal that activates compensator 845c only in response to an instantaneous load current that is below the average load current by a predetermined offset amount. This current condition would correspond to a significant load decrease at the output of converter 800.

Fast control loop for load dump control loop 840c can therefore operate as generally described above, being a relatively faster control loop that effectively regulates the voltage across capacitor Cb in response to a decreasing load. To do so, fast load dump control loop 840c subtracts the voltage Vb from a reference voltage Vref3 equal to Vref1+$\Delta$V in error amplifier 842c to produce an error signal Verror3. (The reference voltage may be offset by $\Delta$V to reflect voltage increase associated with a decreasing load transient.) Error signal Verror3 may be input into a compensator 845c that may be a proportional, integral, and/or derivative controller that implements a suitable transfer function to achieve desired control responsiveness and stability. Compensator 845c (along with all control circuitry of control loop 840c) may be implemented using any combination of analog, digital, and/or programmable circuitry, as was described above. The output of compensator 845c can be a third current reference signal Iref3 that goes through a selection process described in greater detail below with reference to selectors 851b and 851c. Ultimately, the selected current reference signal can be provided to current controller 852, which can provide suitable control signals to PWM generator 644 to regulate the switching of main switch Q1 of flyback converter 316.

For correct operation in all load regimes, i.e., steady state load, increasing load transients, and decreasing load transients, the control system can select from the reference signals generated by the respective control loops. A first selector 851b can receive the output reference signals Iref1 from control loop 840a and Iref2 from control loop 840b. Selector 851b can be a high selector that selects the higher reference signal, i.e., the signal commanding the largest current. For non-transient conditions, the reference signal Iref1 output from main control loop 840a would be selected, whereas for a load ramp up transient condition, the reference signal Iref2 from control loop 840b. The output of high selector 851b can be provided as a first input to low selector 851c, which can also receive the output reference signal output from control loop 840c. Low selector 851c can be configured to select the lower reference signal, i.e., the signal commanding the smallest current. For non-load dump transient conditions, the reference signal from the main control loop 840a (or the load ramp up control loop 840c, as appropriate) would be selected. In response to a substantial load decrease, the reference signal Iref3 from control loop 840c would be selected.

The above-described arrangements thus serve to provide ordinary slow loop control in response to steady state conditions, while providing a faster response to load ramp up or load dump transient events. The various parameters of the respective loops, including the described offsets, the length and weighting of the averaging circuits, the parameters of the compensators, etc. may be tuned to provide a desired degree of response and stability in all three operating regimes.

Figure 9:
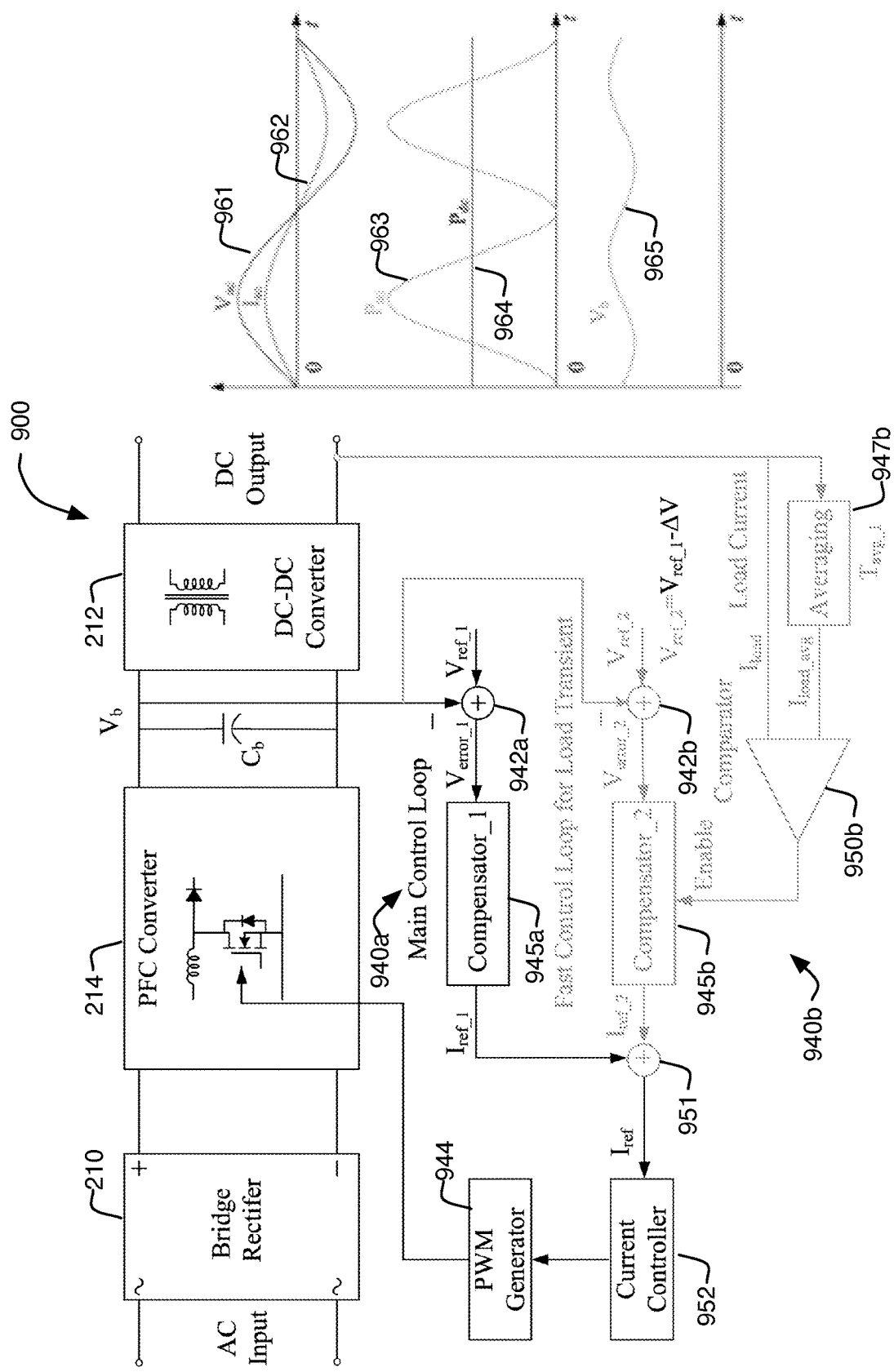
FIG. 9 illustrates a power factor corrected AC-DC converter with multiple control loops.

The multi-loop control system principles described above with reference to FIG. 8 may also be applied to power factor corrected converters, such as those described above with reference to FIG. 2B. Turning to FIG. 9, power factor corrected converter 900 can include a rectifier 210, power factor correction converter 214, and DC-DC converter 212 that function as described above. PFC converter 214 may be controlled by a control loop responsive to the intermediate bus voltage Vb (coupling the output of PFC converter 214 to the input of DC-DC converter 212). PFC converter control loops may be configured to be relatively slow loops, i.e., having a bandwidth less than about half the line frequency of the AC input, to provide the desired power factor and harmonic distortion improvements. Thus, such converters can be susceptible to the same sort of transient stability problems described above with respect to the converter of FIG. 8. A brute force approach to these issues can be to increase the size of capacitor Cb; however, this may not be desirable depending on the physical constraints of a given implementation.

There are two control targets for a PFC converter. The first control target is to maintain stable output voltage to achieve AC input and DC output power balance over a AC line cycle. The second control target is to achieve the sinusoidal input current by either regulating PFC inductor current or directly regulating the turn-on time of the main switch for the PFC converter. The first control target can be realized by a voltage control loop, in which the PFC output voltage $V_b$ is measured, compared with a reference $V_{ref}$, and their error $V_{error}$ is amplified by a compensator, with the compensator output $I_{ref}$ used as the reference for the current controller that controls switching of the PFC converter switching device. The current controller can be designed to regulate the AC input current so that it is sinusoidal and in line with AC input voltage to achieve the second target, and also to regulate the magnitude of the AC input current to follow the reference $I_{ref}$ from the voltage control loop.

FIG. 9 also shows key waveforms of an AC-DC power supply with PFC functionality. Waveform 961/$V_{ac}$ and waveform 962/$I_{ac}$ are the instantaneous AC input voltage and current. Waveform 963/Pac is the instantaneous input power, which is the product of the instantaneous input voltage and current. The input power can be thought of as including two parts: the first part being constant and equal to the output DC power Pdc/964 (if the power loss is neglected). The second part of the input power is pulsating with a frequency that is twice the AC power source frequency. The pulsating power flows into and out of the bulk capacitor Cb and causes the voltage ripple of twice AC source frequency, as shown in waveform 965/Vb. If the voltage ripple couples to the voltage control loop of the PFC converter, that means the reference signal $I_{ref}$ for the current controller will include the second harmonic, then there will be the third harmonic in the AC input current, which will cause low power factor and high harmonic distortion. To prevent the third harmonic current, the compensator in 945a can be designed to limit the bandwidth of the voltage control loop for the PFC converter, for example to under 20 Hz, so that the PFC converter has sufficient attenuation to the PFC converter output voltage ripple of the twice AC power source frequency.

As alluded to above the relatively low bandwidth of the PFC voltage control loop effectively attenuates the third harmonic current in the input AC current; however, it adversely reduces the load transient performance of PFC converters. When the DC output power suddenly increases or decreases, a large output voltage undershoot or overshoot can occur. In extreme cases, such DC load transients may cause the power supply crash. For example, in the condition that the DC load is suddenly increased from light load to full or near full load, the AC input power of the power supply is less than the DC output power, the energy stored in the bulk capacitor Cb has to be discharged to provide the energy to the DC load, so there will be a undershoot across PFC converter output voltage $V_b$. Because the bandwidth of the voltage control loop for the PFC converter is relatively low, it will take a relatively long time (e.g., ~10 ms or more) for the voltage control loop to catch the load change and restore the balance between the AC input power and the DC load power. If the capacitor Cb is not large enough to sustain the energy discharge during the load transient, the $V_b$ will have a large dip and that can crash the power supply.

To prevent such issues, a large capacitor Cb may be used, but as noted above, this may be undesirable for packaging or other reasons. Moreover, although there are different PFC converter topologies, such as boost PFC, flyback PFC, etc., and although there are different current control methods, such as average current control, peak current control, hysteresis current control, constant on-time control, etc., the issue of low bandwidth for the voltage control loop exists in most if not all PFC corrected AC-DC power supplies.

To overcome the limitation of the low bandwidth voltage control loop for PFC converters and to improve the load transient performance, a new control strategy is proposed, as shown in FIG. 9. The proposed control method consists of two voltage control loops for PFC converters. The compensation network Compensator_1 forms the main voltage control loop for the PFC converter, and this main loop of low bandwidth regulates the PFC converter to achieve the balance between the input power and output power and high power factor performance in steady state, same as the existing PFC voltage control method. In this slow control loop, the measured PFC output voltage $V_b$ is compared with the reference $V_{ref\_1}$ in error amplifier 942a, and their error $V_{error\_1}$ is amplified by Compensator_1 945. The compensation network Compensator_1 is used to adjust the bandwidth of the voltage loop. The output signal of Compensator $I_{ref\_1}$ is used as the reference for the current controller. The bandwidth of the main voltage loop is under 20 Hz to meet the requirement of power factor and harmonic distortion.

Also illustrated in FIG. 9, besides the relatively slow main voltage control loop 940a, there is also a fast control loop 940b for load transients, the bandwidth of which can be adjusted by the compensation network 945b/Compensator_2. Control loop 940b can have a significantly higher bandwidth than the slow main control loop 940a. As discussed above, main control loop 940a can have a bandwidth on the order of a few tens of hertz, e.g., 20-30 Hz, while the fast control loop 940b can have a bandwidth on the order of hundreds of hertz or even into the multiple kilohertz range. During steady-state operation, fast loop 940b can be disabled as described in greater detail below. The output of Compensator_2 945b is zero, so that fast loop 940b does not have any impact on steady state operation of the PFC converter 214. Fast loop 940b is only enabled during load transients. In the event of a load ramping up, the fast control loop can quickly respond to the output voltage drop of PFC converter 214. More specifically, the error signal $V_{error\_2}$ that is the difference between $V_{ref\_2}$ and $V_b$ produced by error amplifier 942b can be quickly amplified by Compensator_2, such that the Compensator_2 output $I_{ref\_2}$ quickly increases and becomes the dominant component of the current reference $I_{ref}$ that is provided to the current controller 952. The current controller 952 can provide suitable control signals to PWM generator 944.

Correspondingly, the duty cycle of PFC converter 214 can be quickly changed to force the PFC converter input current to track the reference $I_{ref}$ output by summing circuitry 951, ultimately restoring the power balance between AC input and DC output. As a result, the AC-DC power supply need not rely on a large capacitor Cb to sustain the load transients. It should be noted that the reference voltages $V_{ref\_1}$ and $V_{ref\_2}$ for the respective control loops could be the same or different.

As described above, fast voltage control loop 940b can be enabled by load transient events. One circuit arrangement for detecting load transient events is shown in FIG. 9. The instantaneous DC output load current $I_{load}$ can be measured, and compared with $I_{load\_avg}$, the averaged load current over a period $T_{ave}$. If the instantaneous load current is the same as the average load current, then the AC-DC power supply is operating in a steady state, and the fast voltage control loop can be disabled. Conversely, if the measured instantaneous load current is (significantly) different than the averaged load current, then a load transient event, either load ramping up or load ramping down, is occurring. As a result, the fast voltage loop can be enabled to quickly respond to the load change. After the duration of the averaging window of $T_{ave}$, the instantaneous load current becomes the same as the averaged load current, and the fast loop can be disabled. Therefore, the time that the fast voltage loop operates can be changed by adjusting the load current averaging period $T_{ave}$. It should be noted that fast control loop 940b is similar in concept and construction to the fast control loops 840b and 840c discussed above. Additionally, they can likewise be constructed using any appropriate combination of analog, digital, and/or programmable circuitry like the various control circuits discussed above.

Figure 10A:
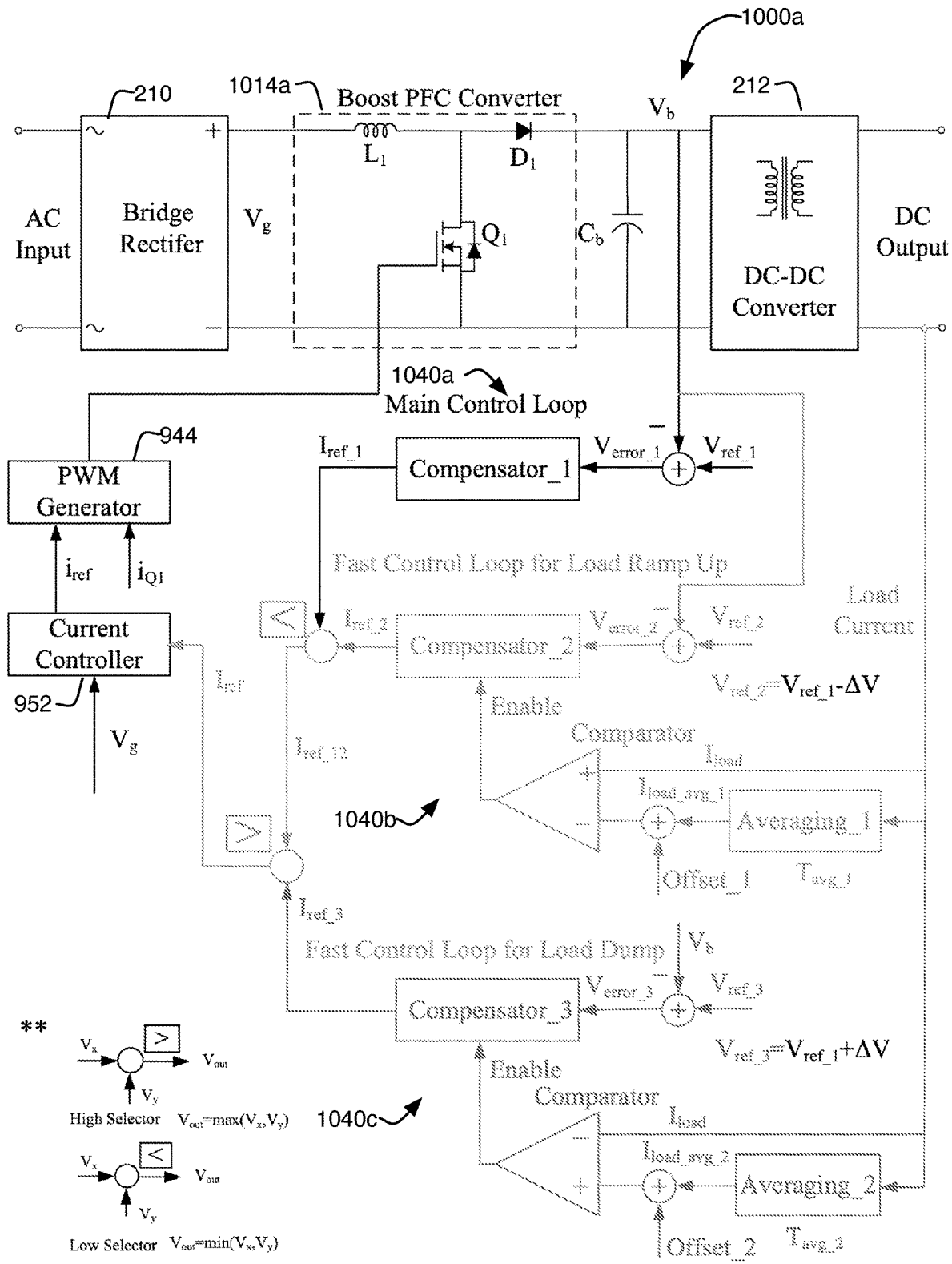
FIG. 10A illustrates a boost converter PFC AC-DC converter with multiple control loops.

The above-described control techniques can be applied to virtually any AC-DC power supply with PFC functionality. FIG. 10A illustrates one implementation of the proposed control strategy for a converter 1000a that includes a Boost PFC converter 1014a that can operate in a critical conduction mode (CCM). The DC/DC converter 212 can be any topology, such as an LLC resonant converter, a flyback converter, a forward converter, etc.

The control strategy can be implemented by one relatively slow main voltage loop 1040a and two fast voltage control loops 1040b and 1040c. Each of these control loops may operate along principles generally similar to those discussed above with respect to FIGS. 8 and 9. For the main voltage control loop, which can have a lower bandwidth on the order of about 20 Hz or less, the measured PFC output voltage $V_b$ can be compared with the reference $V_{ref\_1}$, with their error $V_{error\_1}$ being amplified by the compensator network Compensator_1, which can output a current reference $I_{ref\_1}$.

The second control loop 1040b can be a fast voltage loop that only functions as the load power ramps up and is disabled when the power supply operates in steady state. In this voltage control loop, Boost PFC converter output voltage $V_b$ can be measured and compared with the reference $V_{ref\_2}$. The compensator network Compensator_2 processes their voltage error $V_{error\_2}$ and generates a current reference $I_{ref\_2}$. $I_{ref\_2}$ and $I_{ref\_1}$ can be compared, with the higher one used as the reference $I_{ref\_12}$. In steady state operation, the main voltage loop is in control, and $I_{ref\_12}$ and $I_{ref}$ are equal to $I_{ref}$J. In the conditions that the load current ramps up, the fast loop is in control, and $I_{ref\_12}$ and $I_{ref}$ are equal to $I_{ref\_2}$. Therefore, as the DC load ramps up, Boost PFC converter 1014a can quickly respond to $I_{ref\_2}$ to increase the AC input current, quickly restoring the balance between AC input power and DC load power without crashing the power supply.

The third control loop 1040c can also be a fast voltage loop that only functions as the load power ramps down and is disabled when the power supply operates in steady state. In this voltage control loop, Boost PFC converter output voltage $V_b$ can be measured and compared with the reference $V_{ref\_3}$. The compensator network Compensator_3 processes their voltage error $V_{error\_3}$ and generates a current reference $I_{ref\_3}$. $I_{ref\_3}$ and $I_{ref\_12}$ can be compared, with the lower one used as the reference $I_{ref}$. In steady state operation, the main voltage loop is in control, and $I_{ref\_12}$ and $I_{ref}$ are equal to $I_{ref\_1}$. In the conditions that the load current ramps down, the second fast control loop 1040c is in control, and $I_{ref}$ is equal to $I_{ref\_3}$. Therefore, as the DC load ramps down, Boost PFC converter 1014a can quickly respond to $I_{ref\_3}$ to decrease the AC input current, quickly restoring the balance between AC input power and DC load power without causing an excessive voltage overshoot, which could potentially damage various power supply components.

Figure 10B:
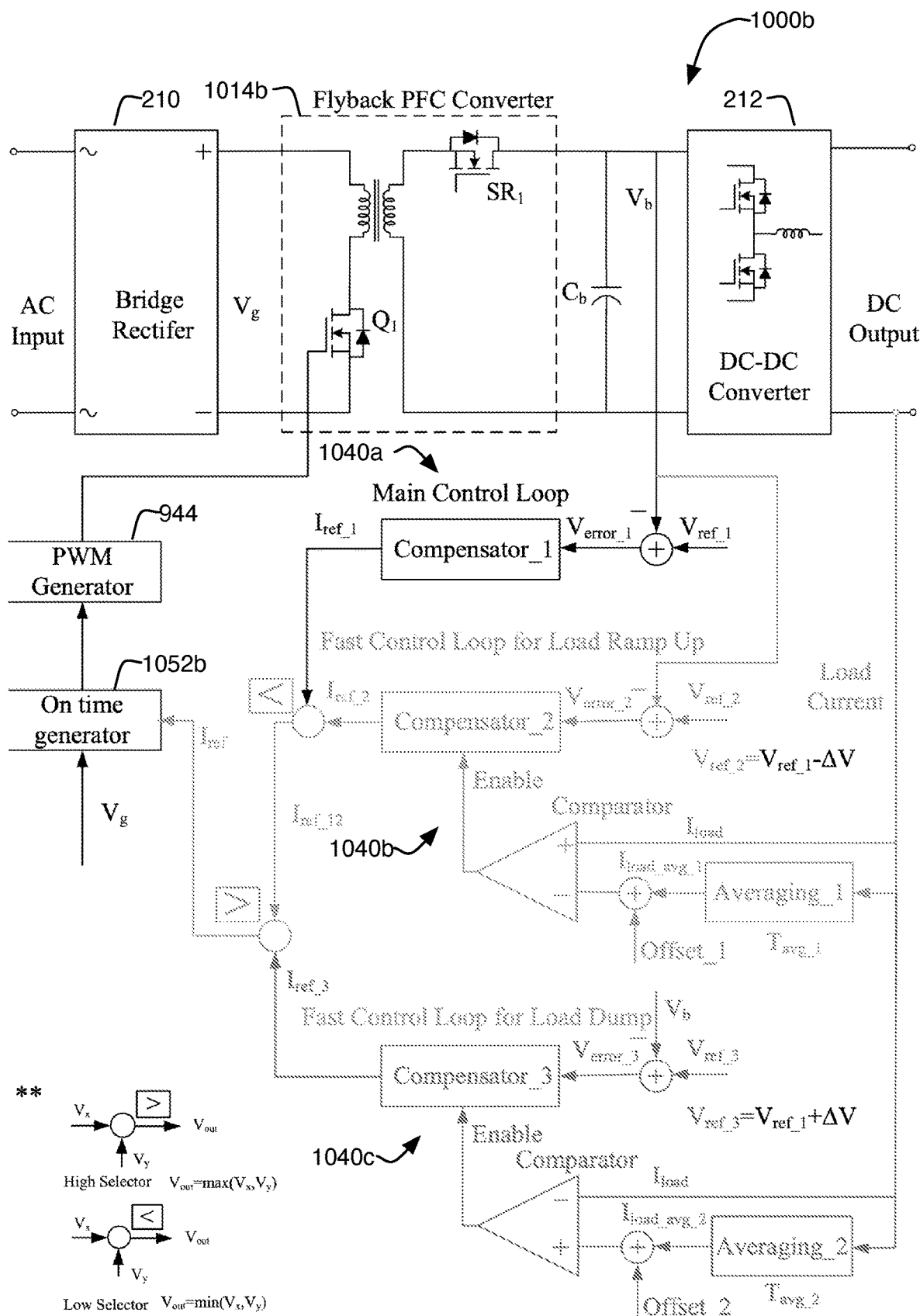
FIG. 10B illustrates a flyback converter PFC AC-DC converter with multiple control loops.

FIG. 10B illustrates another implementation of the proposed control strategy for a converter 1000b that includes a flyback PFC converter 1014b that can operate using on time control. The DC/DC converter 212 can be any topology, such as an LLC resonant converter, a flyback converter, a forward converter, buck converter, boost converter, buck-boost converter, etc.

The control strategy can be implemented by one relatively slow main voltage loop 1040a and two fast voltage control loops 1040b and 1040c. Each of these control loops may operate along principles generally similar to those discussed above with respect to FIGS. 8, 9, and 10A. For the main voltage control loop, which can have a lower bandwidth on the order of about 20 Hz or less, the measured PFC output voltage $V_b$ can be compared with the reference $V_{ref\_1}$, with their error $V_{error\_1}$ being amplified by the compensator network Compensator_1, which can output a current reference $I_{ref\_1}$.

The second control loop 1040b can be a fast voltage loop that only functions as the load power ramps up and is disabled when the power supply operates in steady state. In this voltage control loop, Boost PFC converter output voltage $V_b$ can be measured and compared with the reference $V_{ref\_2}$, the compensator network Compensator_2 processes their voltage error $V_{error\_2}$ and generates a current reference $I_{ref\_2}$. $I_{ref\_2}$ and $I_{ref\_1}$ can be compared, with the higher one used as the reference $I_{ref\_12}$. In steady state operation, the main voltage loop is in control, and $I_{ref\_12}$ and $I_{ref}$ are equal to $I_{ref}$J. In the conditions that the load current ramps up, the fast loop is in control, and $I_{ref\_12}$ and $I_{ref}$ are equal to $I_{ref\_2}$. Therefore, as the DC load ramps up, Boost PFC converter 1014a can quickly respond to $I_{ref\_2}$ to increase the AC input current, quickly restoring the balance between AC input power and DC load power without crashing the power supply.

The third control loop 1040c can also be a fast voltage loop that only functions as the load power ramps down and is disabled when the power supply operates in steady state. In this voltage control loop, Flyback PFC converter output voltage $V_b$ can be measured and compared with the reference $V_{ref\_3}$. The compensator network Compensator_3 processes their voltage error V error 3 and generates a current reference $I_{ref\_3}$. $I_{ref\_3}$ and $I_{ref\_12}$ can be compared, with the lower one used as the reference $I_{ref}$. In steady state operation, the main voltage loop is in control, and $I_{ref\_12}$ and $I_{ref}$ are equal to $I_{ref\_1}$. In the conditions that the load current ramps down, the second fast control loop 1040c is in control, and $I_{ref}$ is equal to $I_{ref\_3}$. Therefore, as the DC load ramps down, Flyback PFC converter 1014b can quickly respond to $I_{ref\_3}$ to decrease the AC input current, quickly restoring the balance between AC input power and DC load power without causing an excessive voltage overshoot, which could potentially damage various power supply components.

The foregoing describes exemplary embodiments of power converters with active power buffers, which may be used as part of an AC/DC converter. Such systems may be used in a variety of applications but may be particularly advantageous when used in conjunction with power supplies for personal computers and associated peripherals. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power converter comprising:
a rectifier that receives an AC input voltage and produces a rectified output voltage;
a power factor correction (PFC) converter having an input coupled that receives the rectified output voltage of the rectifier and an output that provides an intermediate DC bus voltage;
a DC-DC converter having an input that receives the intermediate DC bus voltage and produces a regulated DC output voltage; and
control circuitry for the PFC converter that includes a relatively slower control loop that controls the PFC converter during steady state load conditions and at least one relatively faster control loop that controls the PFC converter during transient load conditions, wherein the at least one relatively faster control loop compares the intermediate DC bus voltage to a reference voltage that is different than a reference voltage of the relatively slower control loop;
wherein the at least one relatively faster control loop comprises a first relatively faster control loop that controls the PFC converter during transient load conditions resulting from a load increase and a second relatively faster control loop that controls the PFC converter during transient load condition resulting from a load decrease, and
wherein the control circuitry further comprises selection circuitry that selects a reference signal from among output signals of the relatively slower control loop, the first relatively faster control loop, and the second relatively faster control loop.

2. The power converter of claim 1 wherein the selected reference signal is provided to a current controller and a pulse width modulation signal generator that generate drive signals for a switching device of the PFC converter.

3. The power converter of claim 1 wherein the PFC converter is a boost converter.

4. The power converter of claim 1 wherein the PFC converter is a flyback converter.

5. The power converter of claim 1 wherein the relatively slower control loop has a bandwidth less than the line frequency of an AC input to the power converter.

6. The power converter of claim 5 wherein the relatively slower control loop has a bandwidth less than half the line frequency of the AC input to the power converter.

7. A power converter comprising:
a rectifier that receives an AC input voltage and produces a rectified output voltage;
power factor correction (PFC) converter having an input coupled that receives the rectified output voltage of the rectifier and an output that provides an intermediate DC bus voltage;
a DC-DC converter having an input that receives the intermediate DC bos voltage and produces a regulated DC output voltage; and
control circuitry for the PFC converter that includes a relatively slower control loop that controls the PFC converter during steady state load conditions and at least one relatively faster control loop that controls the PFC converter during transient load conditions, wherein the at least one relatively faster control loop compares the intermediate DC bus voltage to a reference voltage that is different than a reference voltage of the relatively slower control loop;
wherein the relatively slower control loop is responsive to the intermediate DC bus voltage, and the at least one relatively faster control loop is responsive to the intermediate DC bus voltage and a load current of the power converter.

8. The power converter of claim 7 wherein the at least one relatively faster control loop compares an instantaneous value of the load current to an average value of the load current over a time period.

9. The power converter of claim 8 wherein the relatively faster control loop compares the instantaneous value of the load current to the average value of the load current over the time period plus an offset.

10. The power converter of claim 7 wherein the PFC converter is a boost converter.

11. The power converter of claim 7 wherein the PFC converter is a flyback converter.

12. A method of operating an AC-DC converter having a rectifier, a power factor correction (PFC) converter, and a DC-DC converter, the method comprising:
operating one or more switching devices of the DC-DC converter to regulate an output voltage of the AC-DC converter; and
operating one or more switching devices of the PFC converter to maintain unity power factor at an input of the AC-DC converter and an average voltage across an intermediate bus of the AC-DC converter coupling an output of the PFC converter to an input of the DC-DC converter by controlling switching of the one or more switching devices of the PFC converter using a relatively slower control loop that controls the PFC converter during steady state load conditions and at least one relatively faster control loop that controls the PFC converter during transient load conditions;
wherein controlling switching of the one or more switching devices of the PFC converter using a relatively slower control loop that controls the PFC converter during steady state load conditions and at least one relatively faster control loop that controls the PFC converter during transient load conditions further comprises using the at least one relatively faster control loop to compare the intermediate DC bus voltage to a reference voltage that is different than a reference voltage of the relatively slower control loop;
wherein the at least one faster control loop comprises a first relatively faster control loop that controls the PFC converter during transient load conditions resulting from a load increase and a second relatively faster control loop that controls the PEC converter during transient load condition resulting from a load decrease; and
wherein controlling switching of the one or more switching devices of the PFC converter using a relatively slower control loop that controls the PFC converter during steady state load conditions and at least one relatively faster control loop that controls the PFC converter during transient load conditions further comprises selecting a reference signal from among output signals of the relatively slower control loop, the first relatively faster control loop, and the second relatively faster control loop.

13. The method of claim 12 further comprising providing the selected reference signal to a current controller and a pulse width modulation signal generator that generate drive signals for one or more switching devices of the PFC converter.

14. The method of claim 12 wherein the relatively slower control loop has a bandwidth less than half the line frequency of an AC input to the AC-DC converter.

15. A method of operating an AC-DC converter having a rectifier, a power factor correction (PFC) converter, and a DC-DC converter, the method compising:
  operating one or more switching devices of the DC-DC converter to regulate an output voltage of the AC-DC converter; and
  operating one or more switching devices of the PFC converter to maintain unity power factor at an input of the AC-DC converter and an average voltage across an intermediate bus of the AC-DC converter coupling an output of the PFC converter to an input of the DC-DC converter by controlling switching of the one or more switching devices of the PFC converter using a relatively slower control loop that controls the PFC converter during steady state load conditions and at least one relatively faster control loop that controls the PFC converter during transient load conditions;
  wherein controlling switching of the one or more switching devices of the PFC converter using a relatively slower control loop that controls the PFC converter during steady state load conditions and at least one relatively faster control loop that controls the PFC converter during transient load conditions further comprises using the at least one relatively faster control loop to compare the intermediate DC bus voltage to a reference voltage that is different than a reference voltage of the relatively slower control loop,
  wherein the relatively slower control loop is responsive to the intermediate DC bus voltage, and the at least one relatively faster control loop is responsive to the intermediate DC bus voltage and a load current of the AC-DC converter.

16. The method of claim 15 wherein controlling switching of the one or more switching devices of the PFC converter using a relatively slower control loop that controls the PFC converter during steady state load conditions and at least one relatively faster control loop that controls the PFC converter during transient load conditions further comprises comparing an instantaneous value of a load current to an average value of the load current over a time period.

17. The method of claim 15 wherein the relatively slower control loop has a bandwidth less than half the line frequency of the AC input to the AC-DC converter.

* * * * *

UNITED STATES PATENT AND TRADEMARK OFFICE
CERTIFICATE OF CORRECTION

PATENT NO. : 12,341,434 B2
APPLICATION NO. : 17/663143
DATED : June 24, 2025
INVENTOR(S) : Yantao Song et al.

Page 1 of 1

It is certified that error appears in the above-identified patent and that said Letters Patent is hereby corrected as shown below:

In the Claims

Column 21, Claim 7, Line 61, replace the word "bos" with --bus--.

Column 22, Claim 12, Line 53, replace the word "PEC" with --PFC--.

Signed and Sealed this
Sixteenth Day of September, 2025

Coke Morgan Stewart
*Acting Director of the United States Patent and Trademark Office*